United States Patent
McGraw et al.

(10) Patent No.: US 8,103,045 B2
(45) Date of Patent: Jan. 24, 2012

(54) STRUCTURE FUNCTION MONITOR

(75) Inventors: John T. McGraw, Placitas, NM (US);
Peter C. Zimmer, Albuquerque, NM (US); Mark R. Ackermann, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 1695 days.

(21) Appl. No.: 11/325,635

(22) Filed: Jan. 4, 2006

(65) Prior Publication Data
US 2006/0177102 A1      Aug. 10, 2006

Related U.S. Application Data

(60) Provisional application No. 60/641,655, filed on Jan. 4, 2005.

(51) Int. Cl.
*G06K 9/00* (2006.01)
*G06K 9/36* (2006.01)
*G01J 1/20* (2006.01)

(52) U.S. Cl. ...... 382/100; 382/107; 382/280; 250/201.9
(58) Field of Classification Search ............ 382/280, 382/100; 250/201.9
See application file for complete search history.

(56) References Cited

U.S. PATENT DOCUMENTS

| | | | |
|---|---|---|---|
| 3,514,612 A | 5/1970 | De Graffenried | |
| 4,938,596 A * | 7/1990 | Gauthier et al. | 356/515 |
| 5,093,563 A * | 3/1992 | Small et al. | 250/201.9 |
| 5,150,171 A | 9/1992 | Hill | |
| 5,343,287 A | 8/1994 | Wilkins | |
| 5,412,200 A | 5/1995 | Rhoads | |
| 5,448,053 A | 9/1995 | Rhoads | |
| 5,469,250 A | 11/1995 | Holmes | |
| 5,969,334 A | 10/1999 | Hutchin | |
| 5,969,344 A | 10/1999 | Tseng | |
| 6,084,227 A * | 7/2000 | Rhoads | 250/201.9 |
| 6,344,640 B1 | 2/2002 | Rhoads | |
| 6,429,415 B1 * | 8/2002 | Rhoads | 250/208.1 |
| 6,452,146 B1 * | 9/2002 | Barchers | 250/201.9 |
| 6,496,252 B1 * | 12/2002 | Whiteley | 356/121 |
| 6,505,508 B1 | 1/2003 | Kameyama et al. | |
| 6,549,700 B1 | 4/2003 | Sweatt | |
| 6,606,175 B1 | 8/2003 | Sampsell et al. | |
| 6,646,725 B1 | 11/2003 | Eichinger | |
| 6,784,408 B1 | 8/2004 | Cheung et al. | |
| 2001/0006210 A1 | 7/2001 | Yanagi et al. | |
| 2002/0007945 A1 | 1/2002 | Neuroth et al. | |
| 2005/0151961 A1 | 7/2005 | McGraw et al. | |

OTHER PUBLICATIONS

Baba et al. "Measurement of Telescope Aberrations Through Atmospheric Turbulence by use of Phase Diversity" Applied Optics, vol. 40 No. 4, Feb. 2001, pp. 544-552.*

(Continued)

*Primary Examiner* — Brian Werner
*Assistant Examiner* — Utpal Shah
(74) *Attorney, Agent, or Firm* — Schwegman, Lundburg & Woessner, P.A.

(57) ABSTRACT

Methods and apparatus for a structure function monitor provide for generation of parameters characterizing a refractive medium. In an embodiment, a structure function monitor acquires images of a pupil plane and an image plane and, from these images, retrieves the phase over an aperture, unwraps the retrieved phase, and analyzes the unwrapped retrieved phase. In an embodiment, analysis yields atmospheric parameters measured at spatial scales from zero to the diameter of a telescope used to collect light from a source.

54 Claims, 18 Drawing Sheets

OTHER PUBLICATIONS

Avila, R., et al., "Generalized SCIDAR measurements at San Pedro Martir. I. Turbulence profile statistics", *Publications of the Astronomical Society of the Pacific*, 11(821), (Jul. 2004),682-92.

Avila, R., et al., "Whole atmospheric-turbulence profiling with generalized scidar", *Applied Optics*, 36(30), (Oct. 20, 1997),7898-905.

Bally, J, et al., "A Hartmann differential image motion monitor (H-DIMM) for atmospheric turbulence characterization", *Publications of the Astronomical Society of Australia*, 13(1), (Jan. 1996),22-7.

Beckers, J M., "Adaptive Optics for Astronomy: Principles, Performance and Applications", *Ann. Rev. Astron. Astrophys.*, 31, (1993),13-62.

Belen'Kii, M. S., et al., "Experimental validation of the differential image motion lidar concept", *Optics Letters*, 25(8), (Apr. 15, 2000),518-20.

Bond, W. C., "Observations on the satellite of Neptune, made at the Cambridge Observatory 1847-48", *Astronomische Nachrichten*, 31, (1851),35-42.

Cederquist, J. N., et al., "Wave-front phase estimation from Fourier intensity measurements", *Journal of the Optical Society of America A (Optics and Image Science)*, 6(7), (Jul. 1989),1020-6.

Ciddor, P. E., et al., "Refractive index of air: new equations for the visible and near infrared", *Applied Optics*, 35(9), (Mar. 20, 1996),1566-73.

Cooley, J W., "An Algorithm for the Machine Calculation of Complex Fourier Series", *Mathematics of Computation*, 19(90), (Apr. 1965),297-301.

Dainty, F. C., "The transfer function, signal-to-noise ratio, and limiting magnitude in stellar speckle interferometry", *Monthly Notices of the Royal Astronomical Society*, 169(3), (Dec. 1974),631-41.

Dubosclard, G., et al., "Forecasting and optimizing astronomic image quality using acoustic sounding", *Astronomy and Astrophysics*, v 140, n 2, pt.2, (Nov. 1984),273-6.

Duric, N., et al., "Characterization of atmospheric turbulence at four mesa-top sites in New Mexico", *Astronomical Society of the Pacific Conference Series*, 174 (1999),95-108.

Eaton, Frank A., et al., "Measurements of optical turbulence in complex terrain", *11th Symposium on Meteorological Observations and Instrumentation*, (2001),211-216.

Erickson, H. P., et al., "The Fourier transform of an electron micrograph: effects of defocussing and aberrations, and implications for the use of underfocus contrast enhancement", *Berichte der Bunsen-Gesellschaft fÃ¼r physikalische Chemie*, 74, (1970),1129-1137.

Fienup, J. R., et al., "Hubble Space Telescope characterized by using phase-retrieval algorithms", *Applied Optics*, 32(10), (Apr. 1, 1993),1747-67.

Fienup, J. R., "Phase retrieval algorithms: a comparison", *Applied Optics*, 21(15), (Aug. 1, 1982),2758-69.

Flynn, T. J., "Two-dimensional phase unwrapping with minimum weighted discontinuity", *Journal of the Optical Society of America A: Optics and Image Science, and Vision*, 14(10), (Oct. 1997),2692.

Fried, D. L., "Differential angle of arrival: Theory, evaluation and measurement feasibility [atmospheric light propagation]", *Radio Science*, 10(1), (Jan. 1975),71-6.

Fried, D. L., "Least-square fitting a wave-front distortion estimate to an array of phase-difference measurements", *Journal of the Optical Society of America*, 67(3), (Mar. 1977),370-5.

Fried, D. L., "Optical resolution through randomly inhomogeneous medium for very long and very short exposures", *Optical Society of America—Journal*,56(10), (Oct. 1966),1372-1379.

Fried, D L., "Statistics of a Geometric Representation of Wavefront Distortion", *Journal of the Optical Society of America*, 55(11), (Nov. 1965),1427-1435.

Frigo, M., et al., "FFTW: an adaptive software architecture for the FFT", *Proceedings of the 1998 IEEE International Conference on Acoustics, Speech and Signal Processing*, ICASSP '98, vol. 3, (1998),1381-4.

Fuchs, A., et al., "Focusing on a Turbulent Layer: Principle of the "Generalized SCIDAR"", *Publications of the Astronomical Society of the Pacific*, 743, (1998),86-91.

Gerchberg, R. W., et al., "A practical algorithm for the determination of phase from image and diffraction plane pictures", *Optik*, 35(2), (1972),237-246.

Gerchberg, R. W., et al., "Phase determination from image and diffraction plane pictures in the electron microscope", *Optik*, 34(3), (1971),275-284.

Goldstein, R. M., et al., "Satellite radar interferometry: two-dimensional phase unwrapping", *Radio Science*, 23(4), (Jul.-Aug. 1988),713-20.

Gonsalves, R. A., "Phase retrieval from modulus data", *Journal of the Optical Society of America*, 66(9), (Sep. 1976),961-4.

Harlan, E. A., et al., "A star-trail telescope for astronomical site-testing", *Publications of the Astronomical Society of the Pacific*, 77, (1965),246-252.

Hecquet, J., et al., "Comparison of optical measurements of seeing and calculations based on radiosonde data", *Astronomy and Astrophysics*, 225(2), (Nov. 1989),585-90.

Herrmann, J., et al., "Coherent interacation between ultrashort light pulses in a resonant absorbing medium", *Journal of the Optical Society of America*, 70(6), (Jun. 1980),592-593.

Hoppe, W., "Principles of electron structure research at atomic resolution using conventional electron microscopes for the measurement of amplitudes and phases", *Acta Crystallographica, Section A (Crystal Physics, Diffraction, Theoretical and General Crystallography)*, v A26, pt.4, (Jul. 1970),414-26.

Kolmogoroff, A., "The local structure of turbulence in incompressible vicous fluid for very large Reynolds' numbers", *Comptes Rendus (Doklady) de l'Academie des Sciences de l'URSS*, 30(4), (1941),301-305.

Krist, J. E., et al., "Phase-retrieval analysis of pre- and post-repair Hubble Space Telescope images", *Applied Optics*, 34(22), (Aug. 1, 1995),4951-64.

Lowman, A. E., et al., "Phase retrieval camera for testing NGST optics", *Proceedings of the SPIE—The International Society for Optical Engineering*, 4850, (2003),329-35.

Martin, H M., "Image motion as a measure of seeing quality", *Publications of the Astronomical Society of the Pacific*, 99(622), (Dec. 1987),1360-70.

Rest, A., et al., "The APO differential image motion seeing monitor", *Bulletin of the American Astronomical Society*, 32, (2000),1599.

Rocca, A., et al., "Detection of atmospheric turbulent layers by spatiotemporal and spatioangular correlation measurements of stellar-light scintillation", *Journal of the Optical Society of America*, 64(7), (Jul. 1974),1000-4.

Sanchez, L. J., "Contributions of the surface layer to the seeing at San Pedro Martir: simultaneous microthermal and dimm measurements", *Revista mexicana de astronomÃa y astrofísica*, 19, (2003),23-30.

Sarazin, M, "The ESO Differential Image Motion Monitor", *Astronomy & Astrophysics*, 227(1), (Jan. 1990),294-300.

Song, Moon-Ho S., et al., "Phase unwrapping of MR phase images using Poisson equation", *IEEE Transactions on Image Processing*, 4(5), (May 1995),667-76.

Tuttle, C. E., *Multiple-core optical fibers for stellar interferometry*, Ph.D., The University of New Mexico,(2000),1-454.

Valley, G C., "Isoplanatic degradation of tilt correction and short-term imaging systems", *Applied Optics*, 19(4), (Feb. 15, 1980),574-577.

Vernin, J., et al., "Measuring astronomical seeing: the DA/IAC DIMM", *Publications of the Astronomical Society of the Pacific*, 107(709), (Mar. 1995),265-72.

Wyngaard, J. C., et al., "Atmospheric turbulence", *Annual review fluid mechanics*, 24, (1992), 205Ã??233.

Zimmer, P. C., "The pattern speeds of M51, M83 and NGC 6946 using carbon monoxide and the Tremaine-Weinberg method, and, Novel techniques for the characterization of optical turbulence in the surface layer", *PhD Dissertation*, University of New Mexico, (Oct. 2004), 1-225.

Avila, R., et al., "Generalized SCIDAR measurements at San Pedro Martir. I. Turbulence profile statistics", *Publications of the Astronomical Society of the Pacific*, 11(821), (Jul. 2004), 682-92.

Avila, R., et al., "Whole atmospheric-turbulence profiling with generalized scidar", *Applied Optics*, 36(30), (Oct. 20, 1997), 7898-905.

Bally, J, et al., "A Hartmann differential image motion monitor (H-DIMM) for atmospheric turbulence characterization", *Publications of the Astronomical Society of Australia*, 13(1), (Jan. 1996), 22-7.

Beckers, J M, "Adaptive Optics for Astronomy: Principles, Performance and Applications", *Ann. Rev. Astron. Astrophys.*, 31, (1993), 13-62.

Belen'kii, M. S., et al., "Experimental validation of the differential image motion lidar concept", *Optics Letters*, 25(8), (Apr. 15, 2000), 518-20.

Bond, W. C., "Observations on the satellite of Neptune, made at the Cambridge Observatory 1847-48", *Astronomische Nachrichten*, 31, (1851), 35-42.

Cederquist, J. N., et al., "Wave-front phase estimation from Fourier intensity measurements", *Journal of the Optical Society of America A (Optics and Image Science)*, 6(7), (Jul. 1989), 1020-6.

Ciddor, P. E., et al., "Refractive index of air: new equations for the visible and near infrared", *Applied Optics*, 35(9), (Mar. 20, 1996), 1566-73.

Cooley, J W, "An Algorithm for the Machine Calculation of Complex Fourier Series", *Mathematics of Computation*, 19(90), (Apr. 1965), 297-301.

Dainty, F. C., "The transfer function, signal-to-noise ratio, and limiting magnitude in stellar speckle interferometry", *Monthly Notices of the Royal Astronomical Society*, 169(3), (Dec. 1974), 631-41.

Dubosclard, G., et al., "Forecasting and optimizing astronomic image quality using acoustic sounding", *Astronomy and Astrophysics*, v 140, n 2, pt.2, (Nov. 1984), 273-6.

Duric, N., et al., "Characterization of atmospheric turbulence at four mesa-top sites in New Mexico", *Astronomical Society of the Pacific Conference Series*, 174, (1999), 95-108.

Eaton, Frank A., et al., "Measurements of optical turbulence in complex terrain", *11th Symposium on Meteorological Observations and Instrumentation*, (2001), 211-216.

Erickson, H. P., et al., "The Fourier transform of an electron micrograph: effects of defocussing and aberrations, and implications for the use of underfocus contrast enhancement", *Berichte der Bunsen-Gesellschaft fÃ¼r physikalische Chemie*, 74, (1970), 1129-1137.

Fienup, J. R., et al., "Hubble Space Telescope characterized by using phase-retrieval algorithms", *Applied Optics*, 32(10), (Apr. 1, 1993), 1747-67.

Fienup, J. R., "Phase retrieval algorithms: a comparison", *Applied Optics*, 21(15), (Aug. 1, 1982), 2758-69.

Flynn, T. J, "Two-dimensional phase unwrapping with minimum weighted discontinuity", *Journal of the Optical Society of America A: Optics and Image Science, and Vision*, 14(10), (Oct. 1997), 2692.

Fried, D L, "Statistics of a Geometric Representation of Wavefront Distortion", *Journal of the Optical Society of America*, 55(11), (Nov. 1965), 1427-1435.

Fried, D. L., "Differential angle of arrival: Theory, evaluation and measurement feasibility [atmospheric light propagation]", *Radio Science*, 10(1), (Jan. 1975), 71-6.

Fried, D. L., "Least-square fitting a wave-front distortion estimate to an array of phase-difference measurements", *Journal of the Optical Society of America*, 67(3), (Mar. 1977), 370-5.

Fried, D. L., "Optical resolution through randomly inhomogeneous medium for very long and very short exposures", *Optical Society of America—Journal*, 56(10), (Oct. 1966), 1372-1379.

Frigo, M., et al., "FFTW: an adaptive software architecture for the FFT", *Proceedings of the 1998 IEEE International Conference on Acoustics, Speech and Signal Processing*, ICASSP '98, vol. 3, (1998), 1381-4.

Fuchs, A., et al., "Focusing on a Turbulent Layer: Principle of the "Generalized SCIDAR"", *Publications of the Astronomical Society of the Pacific*, 743, (1998), 86-91.

Gerchberg, R. W, et al., "A practical algorithm for the determination of phase from image and diffraction plane pictures", *Optik*, 35(2), (1972), 237-246.

Gerchberg, R. W., et al., "Phase determination from image and diffraction plane pictures in the electron microscope", *Optik*, 34(3), 1971 , 275-284.

Goldstein, R. M., et al., "Satellite radar interferometry: two-dimensional phase unwrapping", *Radio Science*, 23(4), (Jul.-Aug. 1988), 713-20.

Gonsalves, R. A., "Phase retrieval from modulus data", *Journal of the Optical Society of America*, 66(9), (Sep. 1976), 961-4.

Harlan, E. A., et al., "A star-trail telescope for astronomical site-testing", *Publications of the Astronomical Society of the Pacific*, 77, (1965), 246-252.

Hecquet, J., et al., "Comparison of optical measurements of seeing and calculations based on radiosonde data", *Astronomy and Astrophysics*, 225(2), (Nov. 1989), 585-90.

Herrmann, J., et al., "Coherent interaction between ultrashort light pulses in a resonant absorbing medium", *Journal of the Optical Society of America*, 70(6), (Jun. 1980), 592-593.

Hoppe, W., "Principles of electron structure research at atomic resolution using conventional electron microscopes for the measurement of amplitudes and phases", *Acta Crystallographica, Section A (Crystal Physics, Diffraction, Theoretical and General Crystallography)*, v A26, pt.4, (Jul. 1970), 414-26.

Kolmogoroff, A., "The local structure of turbulence in incompressible viscous fluid for very large Reynolds' numbers", *Comptes Rendus (Doklady) de l'Academie des Sciences de l'URSS*, 30(4), (1941), 301-305.

Krist, J. E., et al., "Phase-retrieval analysis of pre- and post-repair Hubble Space Telescope images", *Applied Optics*, 34(22), (Aug. 1, 1995), 4951-64.

Lowman, A. E., et al., "Phase retrieval camera for testing NGST optics", *Proceedings of the SPIE—The International Society for Optical Engineering*, 4850, (2003), 329-35.

Martin, H M, "Image motion as a measure of seeing quality", *Publications of the Astronomical Society of the Pacific*, 99(622), (Dec. 1987), 1360-70.

Pant, P, et al., "Microthermal measurements of surface layer seeing at Devasthal site", *Astronomy & Astrophysics Supplement Series*, vol. 136, (Apr. 1, 1999), 19-25.

Rest, A., et al., "The APO differential image motion seeing monitor", *Bulletin of the American Astronomical Society*, 32, (2000), 1599.

Rocca, A., et al., "Detection of atmospheric turbulent layers by spatiotemporal and spatioangular correlation measurements of stellar-light scintillation", *Journal of the Optical Society of America*, 64(7), (Jul. 1974), 1000-4.

Sanchez, L. J., "Contributions of the surface layer to the seeing at San Pedro Martir: simultaneous microthermal and dimm measurements", *Revista mexicana de astronomÃa y astrofisica*, 19, (2003), 23-30.

Sarazin, M, "The ESO Differential Image Motion Monitor", *Astronomy & Astrophysics*, 227(1), (Jan. 1990), 294-300.

Song, Moon-Ho S., et al., "Phase unwrapping of MR phase images using Poisson equation", *IEEE Transactions on Image Processing*, 4(5), (May 1995), 667-76.

Tuttle, C. E., "Multiple-Core Optical Fibers for Stellar Interferometry", *Dissertation, Submitted in Partial Fulfillment of the Requirements for the Degree of Doctor of Philosophy Physics*, The University of New Mexico, Albuquerque, New Mexico, May 2000, Ph.D., The University of New Mexico, (2000), 1-454.

Valley, G C, "Isoplanatic degradation of tilt correction and short-term imaging systems", *Applied Optics*, 19(4), (Feb. 15, 1980), 574-577.

Vernin, J., et al., "Measuring astronomical seeing: the DA/IAC DIMM", *Publications of the Astronomical Society of the Pacific*, 107(709), (Mar. 1995), 265-72.

Whiteley, Matthew, "Rytov parameter estimation by use of differential-tilt measurements", *Proc. SPIE*, 4125, (2000), 7-20.

Wyngaard, J. C., et al., "Atmospheric turbulence", *Annual review fluid mechanics*, 24, (1992), 205-233.

* cited by examiner

Image Plane Intensity

Pupil Plane Intensity

Recovered Phase

STRUCTURE FUNCTION MONITOR

RELATED APPLICATION

This application claims priority under 35 U.S.C. 119(e) from U.S. Provisional Application Ser. No. 60/641,655 filed 4 Jan. 2005, which application is incorporated herein by reference.

GOVERNMENT INTEREST STATEMENT

This invention was made with Government support under Contract DE-AC04-94AL85000 awarded by the United States Department of Energy. The Government has certain rights in the invention.

FIELD OF THE INVENTION

This invention relates generally to turbulence in the atmosphere.

BACKGROUND OF THE INVENTION

Atmospheric turbulence is an indicator of mechanical turbulence. Turbulence associated with tiny temperature differences in air, a refractive medium, are detectable by optical and infrared propagation techniques. This implies that these same refractive index variations degrade images made (horizontally or vertically) through a column of air.

Most atmospheric turbulence detectors, including microthermal sensors and a multi-path Differential Image Motion Monitor (DIMM), while very sensitive to turbulent effects between its optical paths, only measure turbulence on a single, or at most, a few, spatial scales. This limitation is critical in studies of the atmosphere, because atmospheric turbulence is expected to deviate from model predictions, especially for horizontal optical paths. While a design can be extended to multiple microthermal sensors to test multiple spatial separations simultaneously, such a design may become impractical with more than a dozen probes per altitude increment.

BRIEF DESCRIPTION OF THE DRAWINGS

Embodiments of the present invention will be set forth in part in the description that follows, and in part will become apparent to those skilled in the art by reference to the following description of the invention and referenced drawings. The features of the invention may be realized and attained by means of the instrumentalities, procedures, and combinations particularly pointed out in these embodiments and their equivalents.

DETAILED DESCRIPTION

Figure 1:
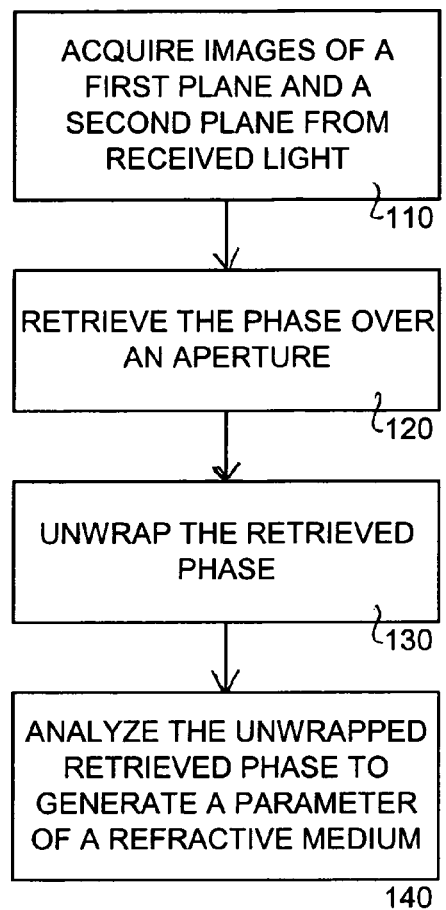
FIG. 1 illustrates features of an embodiment of a method to recover the phase of an electromagnetic wave across an aperture.

In the following detailed description, reference is made to the accompanying drawings which form a part hereof, and in which is shown by way of illustration specific embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description is, therefore, not to be taken in a limiting sense.

In an embodiment, a device, a structure function monitor (SFM), measures the phase structure of a wavefront at the pupil of an imaging system. The structure function monitor may be an atmospheric structure function monitor. An atmospheric phase SFM provides detection and detailed measurement of turbulence in the atmosphere. Atmospheric turbulence principally perturbs wavefront phase and far less perturbs the amplitude. Thus, the phase provides a more significant measure of turbulence. Additionally, by measuring the phase perturbations and correcting them, a "perfect" image can be reconstructed in the presence of blurring caused by atmospheric turbulence. A SFM may detect and measure atmospheric turbulence and may provide phase corrections necessary to reconstruct near diffraction-limited turbulence-blurred images.

In an embodiment, using a known source, a SFM may detect and characterize turbulence for avoidance purposes, such as at airports where wake turbulence, wind shear, and microbursts are threats to airport safety. In various embodiments, a SFM may be utilized in energy and information delivery. Robustly characterized turbulence allows for correcting a propagating wavefront, leading to enhanced fidelity for energy and information delivery and imaging. For example, correcting the atmospheric phase variations induced in a wavefront propagating from an astronomical source allows diffraction-limited imaging. Diffraction-limited imaging provides the best imaging of which an optical system is capable, as determined by the diameter of its aperture and the wavelength of the electromagnetic radiation being observed.

Mapping the phase of an atmospherically-perturbed wavefront has multiple applications. In particular, simultaneous, continuous knowledge of the amplitude and phase of the incoming electromagnetic wave over an aperture has long been the "holy grail" of imaging optics. An atmospheric SFM may be used to measure directly the amplitude and phase of an electromagnetic wave at the aperture (the pupil) of an imaging optical system.

Another atmospheric turbulence detector is a Surface Layer Atmospheric Turbulence Differential Image Motion Measurement (SLAT-DIMM, also referred to as SDIMM), which is presented in co-pending, commonly assigned application, U.S. Ser. No. 11/016,966, which application is incorporated herein by reference. While the SDIMM, for example, can be extended to more than two sources, the practical number of SDIMM apertures that can be placed on a small telescope is but a few. Similar modifications can be made to microthermal probes to test multiple spatial separations simultaneously, but may become impractical with more than a dozen probes per altitude increment. The SFM provides a technique that measures turbulence on many scales.

In addition, turbulence monitoring necessary for image reconstruction requires measuring the effects of turbulence, especially the wavefront phase, over as many spatial (and temporal) scales as possible. The techniques that come closest to direct measurements of the amplitude and phase of a wavefront over a telescope aperture, such as the wavefront sensors used for adaptive optics, yield the greatest possible direct information about atmospheric turbulence. It is ultimately these phase variations that degrade ground-based and astronomical images.

The effect of optical elements at and subsequent to the pupil is to superpose the amplitude and phase of the complex electromagnetic wave in the pupil to produce an image in another plane. The process of image formation is a Fourier transform, and thus the bounded electromagnetic wave in the pupil and the resulting wave in the image plane are Fourier conjugates. Thus, perfect knowledge of the amplitude and phase of the electromagnetic wave in the pupil corresponds to perfect knowledge of the amplitude and phase of the wave in the image plane, and vice versa. This relationship is difficult to achieve in practice because measurements of optical and infrared radiation are almost always photon counting, or intensity measurements. With such measurements, the phase information is lost, because only the squared amplitude of the complex wave is retained. This is generically known as the "phase problem" and overcoming it is known as "phase retrieval." The structure function monitor may implement a method of phase retrieval to recover the phase of the incoming wave across the aperture from intensity measurements made simultaneously in the image and pupil planes. From a map of the phase, all atmospheric quantities as well as image detail (resolution) may be obtained on spatial scales of the diameter of the aperture and smaller.

FIG. 1 illustrates features of an embodiment of a method to recover the phase of an electromagnetic wave across an aperture. At 110, images of a first plane and a second plane from received light are acquired. The first plane and the second plane may be a pupil plane and an image plane. A bounded electromagnetic wave in the pupil plane and a corresponding wave in the image plane may be Fourier conjugates. The received light having a phase and amplitude at an aperture corresponding to the first plane originates from an illumination source distant from the first and second plane. The distance may range to tens of meters to the distance to various stars. Alternatively, the distance may in the range of millimeters or centimeters. The source may be an unresolved source. The source may be an effective point source. Alternatively, an illumination source other than an effective point source may be the original of the illumination.

At 120, the phase over the aperture is retrieved. In an embodiment, a Gerchberg-Saxton algorithm may be used to retrieve the phase. Various other processes may be used to retrieve the phase. At 130, the retrieved phase may be unwrapped. Various processes may be used to unwrap the retrieved phase. At 140, the unwrapped retrieved phase may be analyzed to generate a parameter of a refractive medium. Refractive medium induced wavefront phase errors over the entire aperture may be determined from analyzing the unwrapped retrieved phase. Wavefront phase correction data may be provided to an imaging system in real-time from analyzing the unwrapped retrieved phase. A structure function may be generated from analyzing the unwrapped retrieved phase. Various other parameters may be generated depending on the application of the embodiment of the method for phase retrieval.

Figure 2:
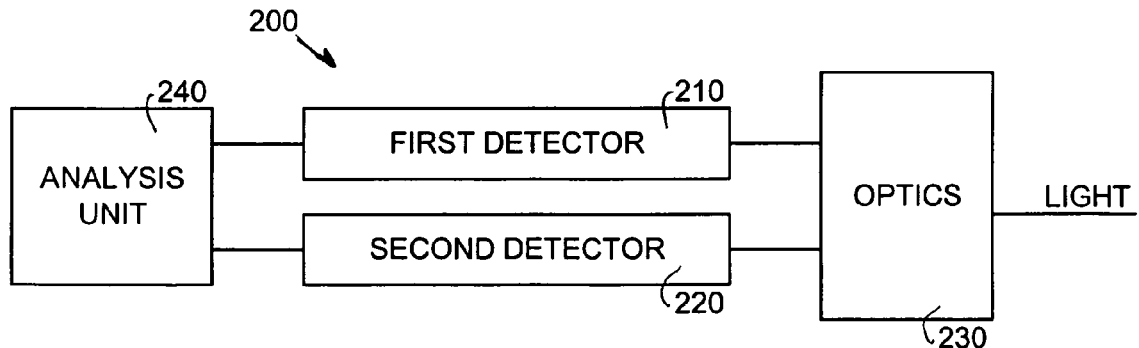
FIG. 2 depicts a block diagram of an embodiment of an apparatus to recover the phase of an electromagnetic wave across an aperture

FIG. 2 illustrates an embodiment of an apparatus 200 to recover the phase of an electromagnetic wave across an aperture. Apparatus 200 includes a detector 210, a detector 220, optics 230, and an analysis unit 240. Detector 210 provides a first image from received light and detector 220 provides a second image from the received light. The first image may be an image at a focal plane with the second image being an image at a pupil plane. The received light may originate from an illumination source distant from the first and second plane. The distance may range to tens of meters to the distance to various stars. Alternatively, the distance may in the range of millimeters or centimeters. The source may be an unresolved source. The source may be an effective point source. Alternatively, an illumination source other than an effective point source may be the original of the illumination. A resolved source may be the origin of the illumination. In an embodiment, apparatus 200 may include a transmitter. The transmitter may provide the illumination source for the received light in the form of a point source, an unresolved source, and/or superluminescent diode. Optics 230 may be arranged to direct portions of the received light to the first detector 210 and to the second detector 220 such that the first image is substantially a Fourier conjugate of the second image.

Analysis unit 240 may be adapted to provide a recovered phase map based on application of a phase retrieval algorithm to the first and the second images and to compute a parameter of a refractive medium based on the recovered phase map. Analysis unit 240 may use a process in which edges of the first and the second images are padded with zeros to begin an algorithm to retrieve the phase of an electromagnetic wave across an aperture. Analysis unit 240 may compute various parameters, such as a structure function, that characterize a refractive medium in which the received light propagates. The refractive medium may be the atmosphere. Apparatus unit 240 may include an output to transmit information of a measurement of perturbation of a wavefront of the received light at a pupil corresponding to the second image. Apparatus 200 may be configured as a device or system providing parameters to other devices or systems. Apparatus 200 may be configured as a system that has an imaging components that use the measured and analyzed data to correct images.

In an embodiment, a SFM device may include a receiver and a monitoring optical system. In an embodiment, a SFM device may include an artificial point source as a transmitter and a receiver as a monitoring optical system. The transmitter may be configured to be 30 m away from the receiver, though this can be varied from 10 m-50 m, dependent upon the configuration of the receiver. The transmitter and the receiver are not limited to separation distances of 10 m-50 m, but shorter or longer separation distances may be used depending on the application. In an embodiment, the receiver optical system may include a small telescope and two high-speed imaging detectors, one detector to image the focal plane and one detector to image the pupil plane via a Fabry lens. Images from each detector are acquired sufficiently rapidly to freeze the atmospheric turbulent effects. In such a situation, a frame rate faster than 200 frames per second may be used.

In an embodiment, a transmitter is a source of electromagnetic radiation. The theoretically simplest source is unresolved by the receiver, thus a device may use small, bright sources that fulfill this criterion. A resolved source could be used for a SFM device, though the data reduction system may become somewhat more complex. A star, for example, is a valid source for observations of the night sky or for astronomical purposes.

The primary parameters that determine the choice of the transmitter source include brightness, physical size, spatial coherence of the emission, and the spectral energy distribution. The source should be bright enough to illuminate the pupil image significantly in short exposure times. In an embodiment, short exposure times may be used that are less than 5 ms. The source should produce an adequate signal-to-noise ratio (S/N) per pixel in the pupil image. In an embodiment, a pupil image has approximately 6500 pixels in 5 ms, when the illumination source is 50 m distant from the receiver. In such a case, the source should be of the order 1 mW, which allows detectors, which have a low quantum efficiency (QE) and poor optical fill factor (a combined QE<10%), to measure the image with appreciable signal-to-noise. This is an achievable source brightness for such sources as light emitting diodes (LEDs), helium-neon (HeNe) lasers, diode lasers, superluminescent diodes (SLD), and halogen lamps. The sources may be selected to emit where the spectral response of the detectors is most significant. In an embodiment using silicon-based detectors, sources should emit in the range 450-750 nm.

The most stringent requirements for an application of a SFM may come from the source dimensions. In an embodiment, to make the interpretation of the phase maps straightforward for a given SFM device, a point source may be used, because resolved sources have phase variations from the source structure added to that of the atmosphere and optical system. For a source to be unresolved by a 0.254 m telescope at a distance of about 30 m-50 m, the diameter of the source emission region should be smaller than 50 microns. In an embodiment, this eliminates both LEDs, because a typical LED emission region is 1-mm or more in diameter, and halogen lamps, because the incandescent filament is typically many millimeters long. These larger sources cannot be spatially filtered with a pinhole, because the efficiency with which LEDs and halogen lamps can be coupled to pinholes is very low and thus produce very dim point-like sources. However, a laser illuminating a 25-micron pinhole or a single-mode optical fiber produces a source that is small enough and bright enough. However, laser coherence causes interference effects in the optical system that lead to pupil images with prominent fringes that do not accurately depict the true source amplitude. Both HeNe and diode lasers may be too coherent, because they have coherence lengths on the order of centimeters. In an embodiment, a superluminescent diode may be used as the artificial source. Alternatively, LEDs, lasers, or other sources may be implemented in a SFM with additional apparatus that provides the appropriate characteristics for the electromagnetic radiation for the SFM.

The SLD has characteristics qualitatively described as halfway between a normal LED and a laser diode. Unlike a standard laser diode, the SLD has much broader emission bandwidth, 8 nm rather than <<1 nm, and a much shorter coherence length, <10 microns compared to many centimeters for HeNe and diode lasers. The emission region of the SLD is approximately 4 square microns, so it is unresolved at all reasonable source distances, and is very bright, up to 3 mW depending on operating current. SLDs are commonly used at near IR wavelengths for telecommunications applications and are becoming more commonly available for optical wavelengths. In an embodiment, SLDs in a SFM configuration have a central emission peak at 684 nm. SLDs may be used in field applications, because they are as reliable and easy to use as normal LEDs. In an embodiment, for a 30 m path length of a SFM setup, the SLD may be operated at 80 mA forward current.

Figure 3:
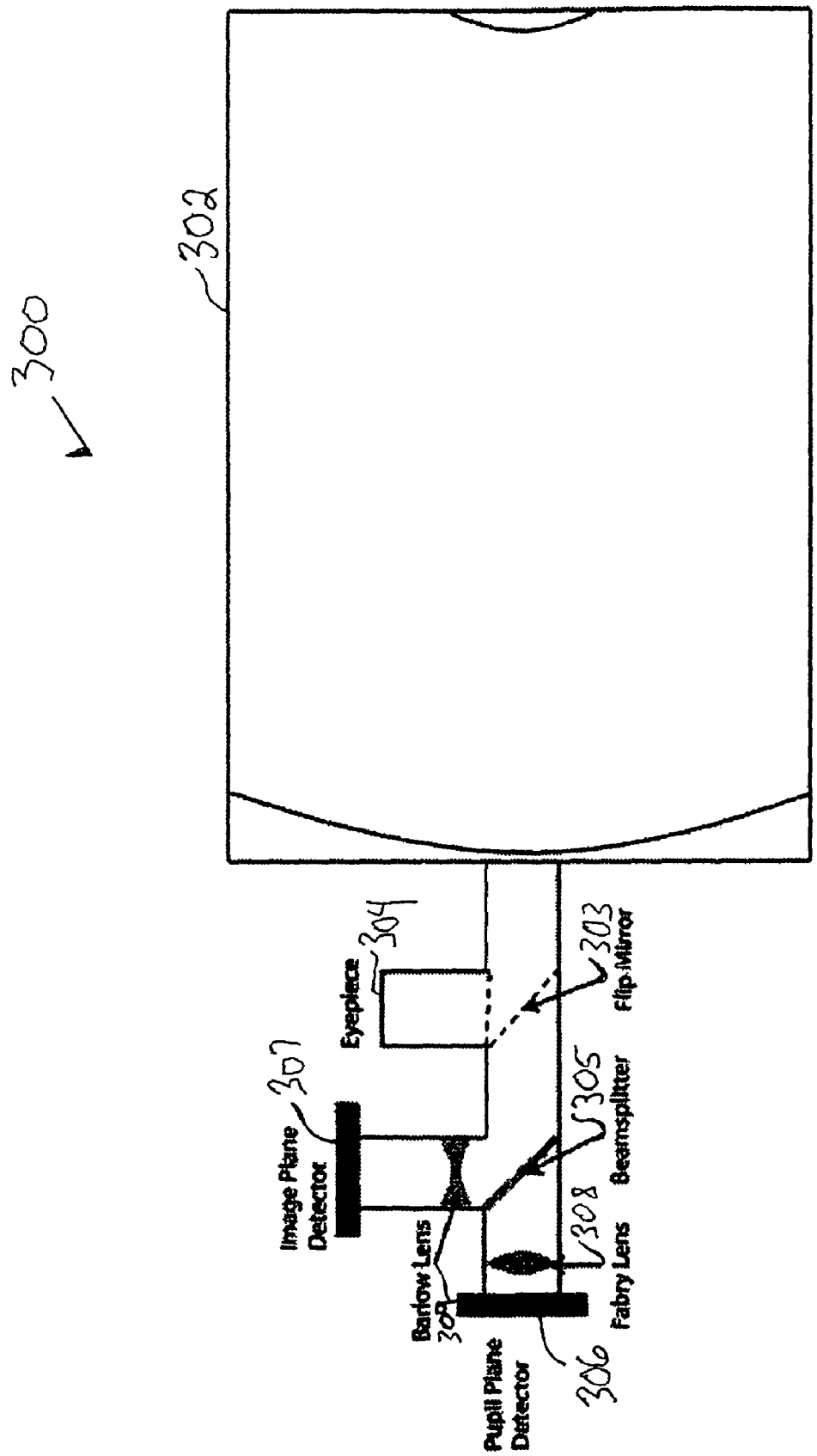
FIG. 3 shows a block diagram of an embodiment of a receiver optical system based on a telescope for a structure function monitor.

In an embodiment, a SFM includes a receiver having a telescope. FIG. 3 shows an embodiment of a SFM receiver optical system 300 based on a 10-inch Meade LX200 f/10 Schmidt-Cassegrain telescope 302. The SFM may use telescope 302 to obtain simultaneous image plane and pupil plane images of an artificial source. The SFM is not limited to obtaining images of artificial sources. SFM receiver optical system 300 may include a JMI electronic focusing stage to allow a high precision and repeatable focus, where the focusing stage may be attached to the telescope instrument mount. SFM receiver optical system 300 may include a flip-mirror 303 pickoff that goes to an eyepiece 304 used for initial alignment. Following flip mirror 303 may be a 50/50 beamsplitter 305 to split the light collected by telescope 302. In an embodiment, 50/50 beamsplitter 305 may be a 25-mm 50/50 beamsplitting cube, the through-path leading to the pupil plane detector 306 and the reflected-path leading to the image plane detector 307. In an embodiment, beamsplitter 305 may have a ratio different from 50/50. Light traveling through splitter 305 encounters a 9 mm diameter f/1 lens 308 that makes an image of the primary mirror on a high-speed CMOS camera. Lens 308 may be a 9-mm f/1 double-convex BK7 lens that images the primary mirror onto detector 306.

Light that is reflected by splitter 305 encounters a Barlow lens 309 that adjusts the effective focal length of the incoming light so that the field scale on the image plane detector 307, another high-speed CMOS camera, is the Fourier conjugate of the pupil plane image. Barlow lens 309 may be realized as a filter and a 12-mm f/1 double-concave lens to adjust the field scale in the image plane. The filter attenuates the amount of light incident on the image plane detector, because the beamsplitter directs equal amount of light to both detectors and the pupil plane image is far more spatially disbursed than the image. The pupil image covers roughly 6500 pixels and requires an acceptable signal-to-noise in each pixel, whereas in the image plane the same amount of light is focused into fewer than 100 pixels with the vast majority of the light going into the central few pixels. The source brightness required to make an acceptable signal-to-noise pupil image taken at the longest exposure time of 5 ms (to freeze atmospheric effects)

saturates the image plane detector at the shortest possible exposure time of 77 microseconds. The filter attenuates the light going to the image plane detector by a factor greater than 100, resulting in an acceptable image plane exposure time of roughly 4 ms. The filter may be a blue filter. A beamsplitter that divides the beam at a higher through-to-reflected ratio, such as 50:1 (instead of 1:1) may help reduce these difficulties, though some attenuation may still be needed.

In an embodiment, both the pupil plane and image plane detectors 306, 307 may be based on EPIX SV2112 CMOS high-speed cameras, which are in turn read out by a dedicated peripheral component interconnect (PCI) card in a 2.0 GHz personal computer (PC). Embodiments using SV2112 detectors may be built around a 1288×1032 6-micron pixel CMOS detector, such as one manufactured by Zoran. These detectors are capable of very fast readouts, up to 60 million pixels per second, but have a very low quantum efficiency of ~30% at 680 nm, a low pixel fill factor of 40%, and a 10 bit analog to digital converter. This combination may lead to poor sensitivity and a small dynamic range by typical astronomical imaging standards. Because it is a CMOS device, it does not have the capability to bin pixels on chip. Devices that are capable of binning pixels on a chip may be used in various embodiments. Other embodiments for a SFM receiver optical system are not limited to the individual components used in this embodiment.

Various design considerations may be taken into account to create a functioning SFM. In an embodiment, a primary requirement of a phase retrieval algorithm for a SFM may include that the images from which the phases are recovered must be Fourier conjugates of each other. The practical ramification is that the pupil and image scales must be matched to maintain that relationship in terms of pixels. There are many trade-offs that exist between the choice of Fabry lens to image the pupil, which determines the physical sampling of the pupil, the size of the aperture, the size of the arrays read out and analyzed, the pixel size of the detector, the f/# of the telescope and several other parameters.

Consider a pupil detector of a SFM receiver optical system. In an embodiment, the pupil may be sampled to enable detection of phase fluctuations of at least 2-cm in size and larger at the entrance aperture. With the primary mirror of a telescope having a 25.4-cm in diameter, a goal may include at least 25 (25 cm/2 cm*2 pixel sampling) pixels across the diameter of the pupil. For the 6-micron pixels of detectors 306, 307 of FIG. 3, where CMOS detectors cannot be multi-pixel binned, 25 pixels across a 25.4-cm pupil that appears 254-cm distant requires a lens with a 1.25-mm focal length. Commercial lenses are typically not available any faster than f/1 and no smaller than about 3 mm in diameter. Lab tests showed it was not practical to use 3 mm diameter lenses because they are difficult to hold, and given telescope system 300 of FIG. 3, difficult to align and focus. In an embodiment, a 9-mm diameter f/1 lens, which may be obtained from Edmund Industrial Optics, may be used, which may make a pupil image roughly 100 pixels across.

In an embodiment, a 128×128 subframe of the pupil plane detector, with a $2^n$ image dimension chosen to optimize the performance of a Fast Fourier Transform (FFT) algorithm, centered on the pupil image may be read out. In the image plane, this corresponds to an effective focal ratio of f/11 and yields an image plane point-source image with a FWHM of 1.5 pixels.

In an embodiment, a Gerchberg-Saxton (GS) algorithm may be used for phase retrieval in a SFM device. The originators, Gerchberg and Saxton, of the GS algorithm noted that the only way they made the algorithm fail was to incorrectly sample one of the two planes, though they did mention a sampling requirement. See, Gerchberg, R. W., et al, "*A Practical Algorithm for the Determination of phase from Image and Diffraction Plane Pictures,*" *Optik,* 35(2) 237-246, 1972. Tests using a GS algorithm with the f/11 image scale and 128×128 image plane images and 128×128 pupil plane images did not converge even after 10,000 iterations.

In an embodiment, the edges of both the pupil plane and image plane images may be padded with zeros to make the new image size 256×256. In the image plane, this has the effect of doubling the resulting pixel scale required to match the sampling in the pupil plane and corresponds to an effective focal ratio of f/22 (set by the negative lens in front of the image plane detector) and a FWHM of 3 pixels.

Because of the Fourier transform relationship between the sampled planes, padding one image around the edges is equivalent to interpolating the conjugate image—doubling the image size in the pupil plane then expands the required image scale in the image plane by a factor of two. By acquiring the images at 128×128, a 200 frames per second frame rate may be maintained. Interpolation achieved by padding the acquired data arrays enables the GS algorithm to converge by appropriately adjusting the spatial frequencies in the image and pupil planes.

downside of padding the images to 256×256 is that the processing time to compute the FFT increases by a factor of N log N (roughly 5). Without the ability to bin images on the CMOS detector, this inefficiency may be acceptable.

The image plane scale may be set and verified using a series of aperture masks with 1, 2 and 4 of 25-mm diameter regularly spaced circular openings. This aperture size guarantees diffraction-limited images under the relatively calm conditions of the lab. The resulting images are then compared to the FFT of the simultaneously acquired pupil image to make sure the scales match. In this case, the phase across the sub-apertures amounts only to shifts in the position of the diffraction pattern. For the single aperture, the diffraction pattern moves slightly. For multiple apertures, the overall spacing between maxima and minima are the same and only the position with respect to the centroid of the pattern changes. In an embodiment, a SFM uses a software system to acquire data from two detectors at a required rate. In an embodiment, acquisition software may be written in Microsoft Visual C++ and may utilize a camera control function library, such as obtained from EPIX. All fundamental parameters of the camera may be set in the acquisition software. Primary acquisition parameters include exposure time, acquisition cadence and autofocusing. Acquisition software is not limited to a particular software language or software vendor.

The cadence of the data acquisition can be tailored to meet the needs of the monitoring project subject to available processing power and data storage. In an example embodiment that may be used in association with the system of FIG. 3, data may be acquired in bursts, up to 1000 frames in both the image plane and pupil plane (five seconds) per burst, but more typically in one or two second bursts. These bursts may be stored in a pair of FITS (flexible image transport system) format data cubes, one each for pupil and image planes, with the time of the first frame encoded in the filename. In the example embodiment, the maximum data acquisition rate is limited by disk performance, which makes the fastest possible observational cadence possible two seconds of continuous data acquired every three seconds, which will generate over 10 GB of data in 15 minutes. A somewhat more useful cadence for long term monitoring is to acquire one second of data every minute, which leads to a similar data quantity in 24 hours.

Initial test operations showed that diurnal temperature variations can change the spacings of the optical elements by more than 2 mm, most of which is due to the thermal expansion of the aluminum tube that holds the secondary-Schmidt corrector combination and the primary mirror. The system should be able to focus itself every 15 minutes to compensate for the effects of a ±1 C.° change in ambient temperature, which is roughly a 250 micron range of focus. Because of the low fill factor and low dynamic range of the detectors, a stable focus metric is not straightforward—variations between measurements of focus quality are of the order the same as the effects of a 250 micron change in focus. During the focusing procedure, the telescope vibrates from the focus motor motion causing the image to move. This image motion across the low fill factor pixels results in the total light detected changing by 30% or more as the peak of the intensity alternately falls onto the active pixel region or in the dead space, which is indistinguishable from the intensity variation in intensity due to focus. Averaging over many exposures reduces this effect.

Figure 4A:
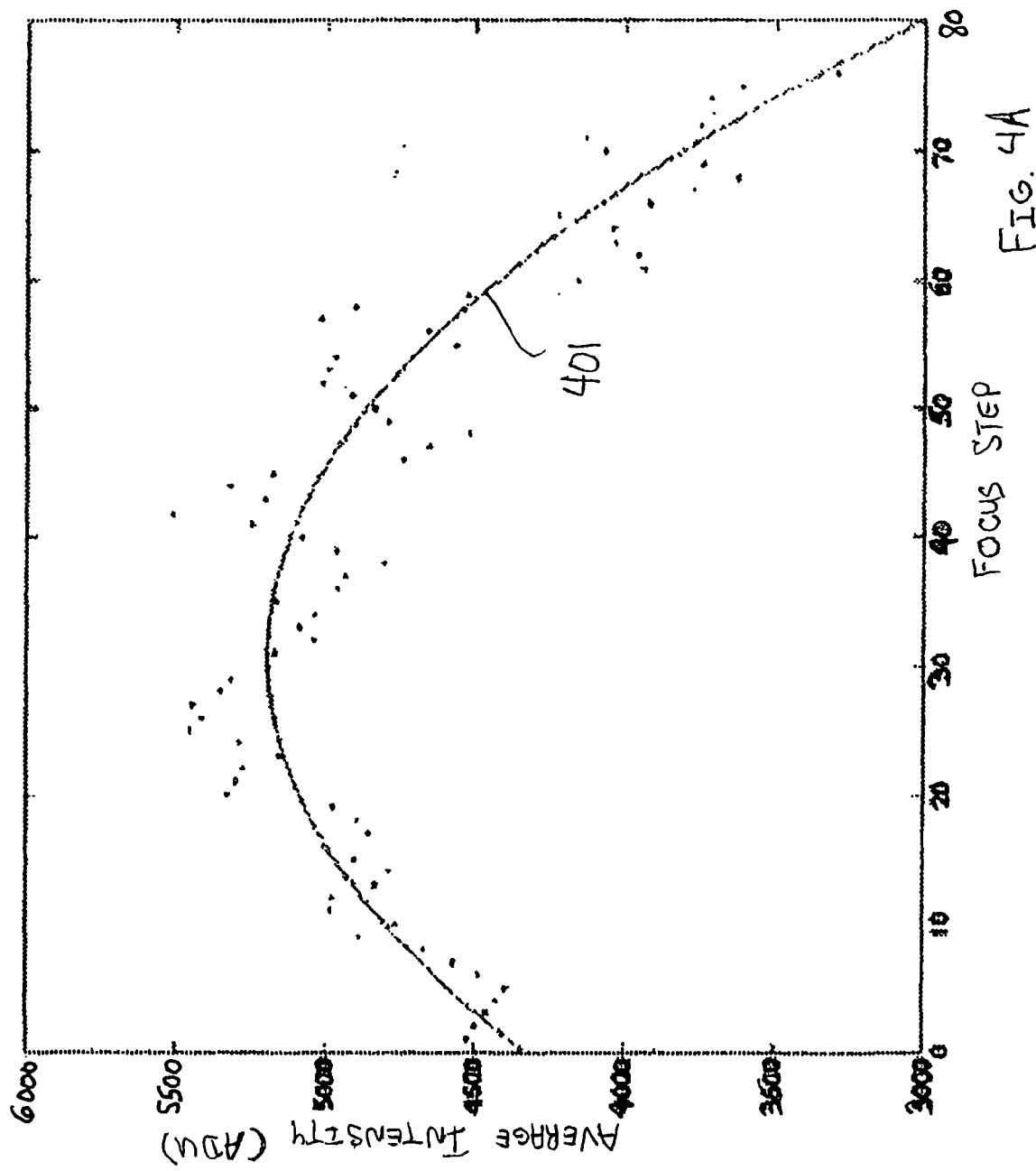
FIG. 4A shows a plot of average intensity versus focus step with the best fit focus shown.
Figure 4B:
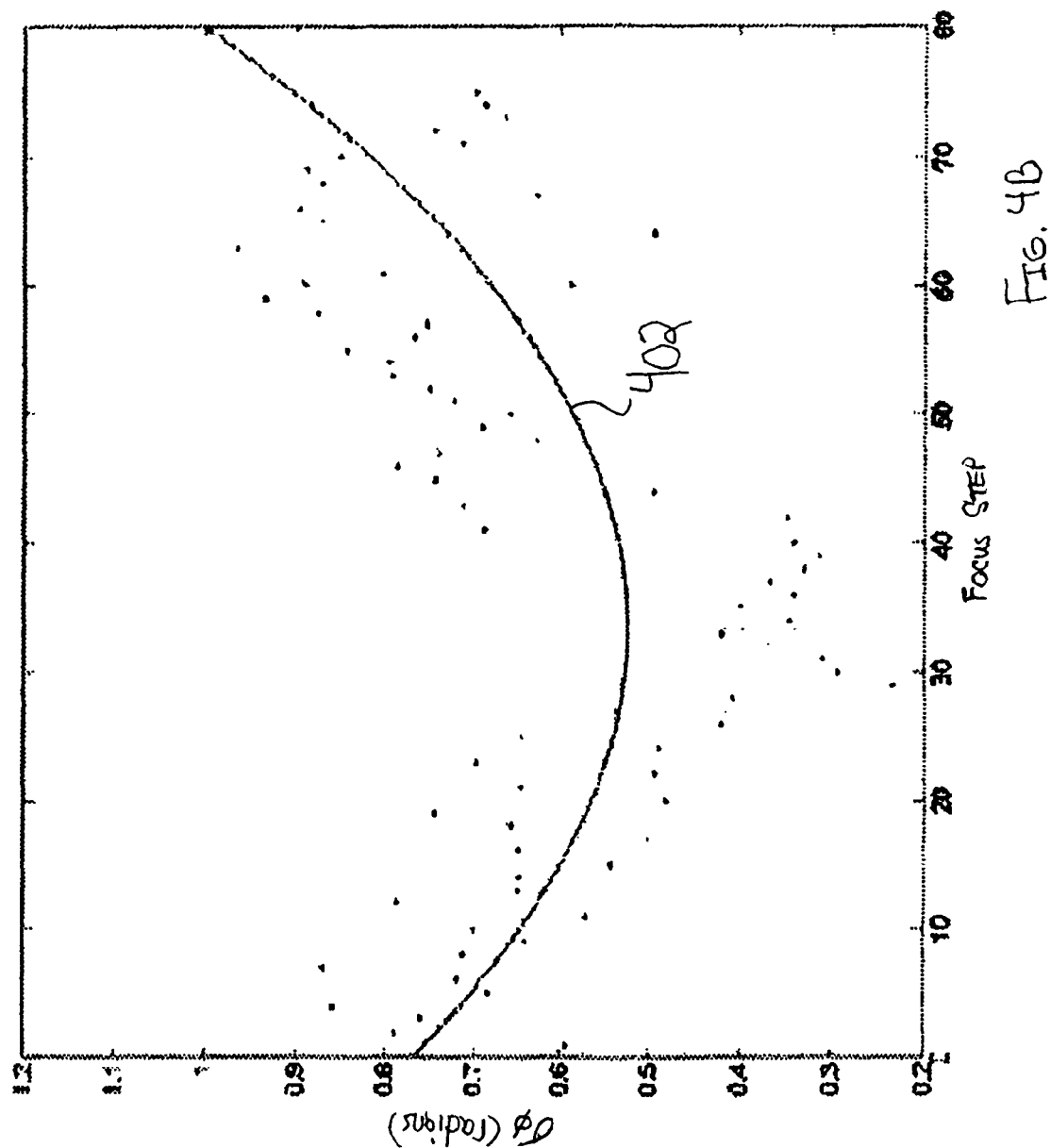
FIG. 4B shows the rms phase of the phase maps recovered from the same data set as FIG. 4A, also fit with a polynomial.

FIGS. 4A and 4B compare candidate focus metrics to root mean square (rms) phase in recovered phase maps. The recovered phasemaps are very sensitive to image plane focus variations of the SFM optical system. Because of diurnal temperature changes, the SFM optical system expands and contracts throughout it normal operation and should incorporate an automatic focusing routine. However, the low fill factor of the CMOS detectors make individual intensity measures in the focal plane erratic. In an embodiment, the focus routine used by the SFM measures the image plane intensity 100 times per focus step of 2.5 microns, which is fit with a quadratic polynomial, the maximum of which is taken as the best focus. FIG. 4A shows a plot of average intensity versus focus step with the best fit focus shown as the line 401. The best focus is achieved at the maximum of curve 401. FIG. 4B shows the rms phase of the phase maps recovered from the same data set, also fit with a polynomial, line 402. While the best focus as discerned from the rms phase, identified as the minimum of curve 402, is slightly different, it is close enough that focus variations in phase will not completely dominate turbulence. In an embodiment, the most robust focus metric was found to be the total intensity in the image plane, 3-σ clipped over 500 frames. Every 15 minutes of operation the autofocus routine starts by moving roughly 125 microns out of focus away from the primary mirror. The routine then moves through a calibrated focus gear backlash removal procedure that minimizes effects of reversing the motor direction. It then steps through 250 microns of focus back toward the mirror in 80 steps. At each step, the 3-σ clipped average intensity is calculated and stored. After data are acquired at all 80 steps, the intensity values as a function of focus position are fit to a parabola and the maximum found. The focus motor backlash removal procedure is again executed and the focuser is then moved to the position of best focus. This process takes roughly two minutes.

Bias and flatfield structure can be removed from the frames "on the fly" by the software if bias and flat frames are taken ahead of time. The pixel readout rate may be chosen so that the bias level is zero for these devices. In an example embodiment, removal of the flatfields has only a very small effect on the resulting phasemaps because variations caused by the low pixel fill factor dominate and so flatfield instrumental signature removal may not routinely be performed.

Figure 5:
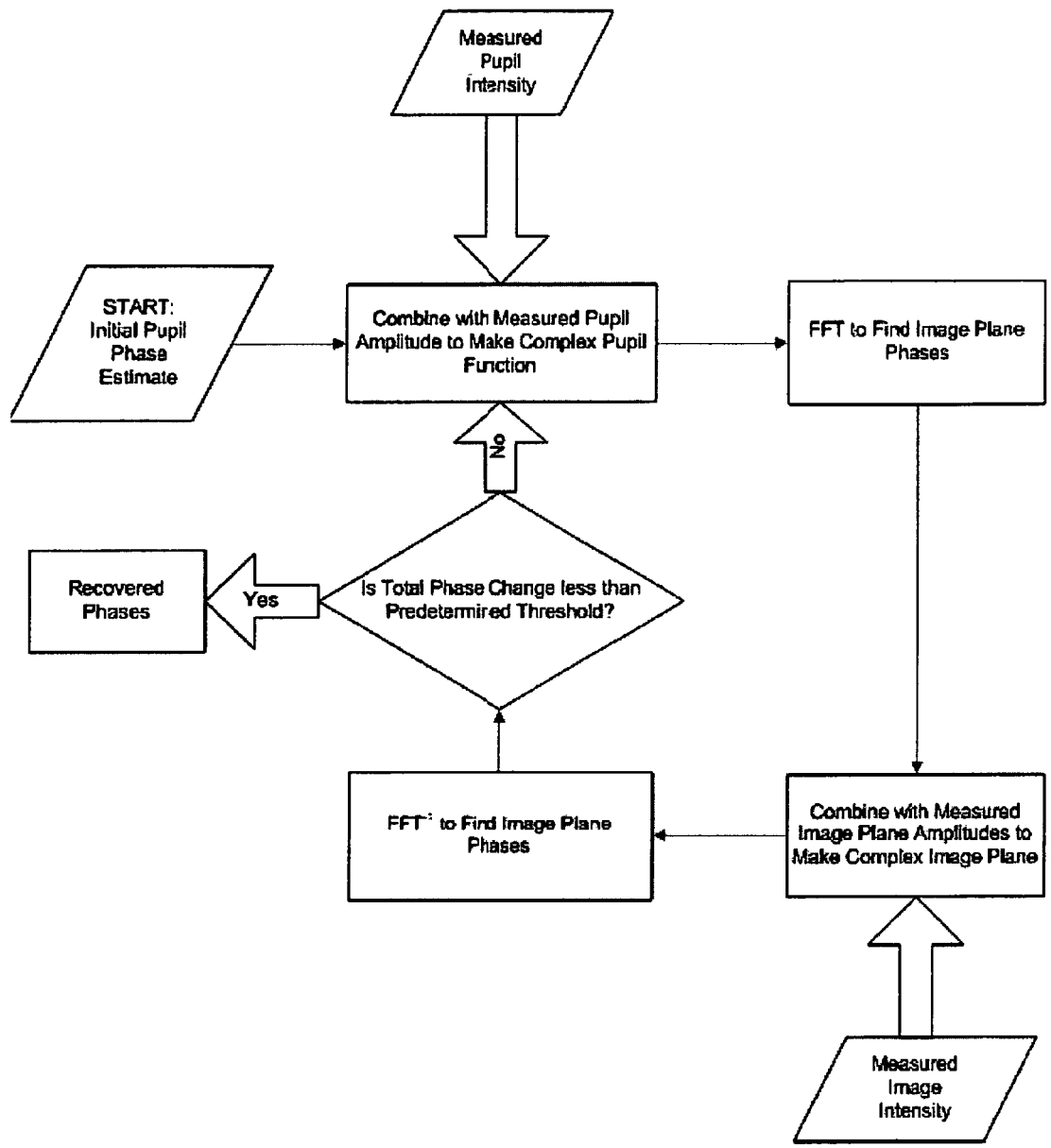
FIG. 5 shows a flowchart of the Gerchberg-Saxton algorithm.

In an embodiment, operation of the SFM uses a software algorithm to map and follow the wavefront phase. A software algorithm that may be employed in a realization of a SFM employs the published GS algorithm for phase retrieval over an aperture. GS provides a method for recovering the phase of a wave that had been recorded simultaneously in two Fourier conjugate planes of an optical system, such as the image and pupil planes of a telescope. Previous phase retrieval methods relied either on approximations that were valid only for small phase variations, required relatively intensive brute-force computation, or both. The key to overcoming these limitations for GS was the advent of the (now ubiquitous) Fast Fourier Transform (FFT) Algorithm. By sampling the wavefront in planes that are Fourier conjugates of each other and then iteratively transforming back-and-forth between them, Gerchberg and Saxton showed that the phase errors in each iteration tend to get smaller (or at worst stay the same). A flowchart of the GS algorithm is shown in FIG. 5.

The GS algorithm is an iterative method to retrieve phase from intensity measurements in Fourier-conjugate planes. Gerchberg and Saxton showed that by Fourier transforming back and forth between the image and pupil planes, each time asserting the measured amplitudes in each plane instead of those generated by the transform, the phases in the pupil plane converge modulo a minus sign, given appropriately chosen starting phases. Starting with area-format images of the pupil and image planes, the amplitudes are obtained by taking the square root of the recorded intensities. Next, a "guess" is made about the initial pupil plane phases. Gerchberg and Saxton advocated using a randomly generated phasemap as the initial guess, but acknowledge that any map will do (except for a constant map). The initial pupil phases are then complex exponentiated and multiplied by the measured amplitude. This becomes the initial estimate of the pupil plane wavefront.

The pupil plane wavefront is then Fourier transformed and the phases extracted in the usual way by calculating the arctangent of the imaginary part divided by the real part of the transform. These extracted phases are the first estimate of the image plane phase. These phases are then complex exponentiated and multiplied by the measured image plane amplitudes to form an estimate of the image plane wavefront. The image plane wavefront is then Fourier transformed back into the pupil plane, and the phases extracted. This process of Fourier transforming and then imposing the measured amplitudes is repeated until the phases no longer change to within some predetermined small amount. Given properly sampled images in each plane, Gerchberg and Saxton showed that the technique will converge to the correct phases in the pupil plane, and hence in the image plane as well.

A GS algorithm has been previously applied with some success in various applications. A GS algorithm has been applied to a theoretical model of a wavefront sensor for adaptive optics. The GS algorithm has been extended for image reconstruction in the case where only pupil image information was available, by applying positional and non-negativity support constraints. From this approach one can think of the traditional GS method as imposing the measured amplitudes in both planes as very specific support constraints. The GS algorithm has also been used in radio interferometry to recover image data from measured amplitudes and phases in the pupil (u,v) plane. A form of GS is included in the well-known AIPS data reduction package, though this technique has fallen into disuse as more robust methods such as CLEAN, MEM, MLM and self-calibration have matured, though the GS algorithm does have some utility with sparsely sampled data. More recently, GS was used to evaluate the figure of the Hubble Space Telescope optical system. Also, a proposed Phase Retrieval Camera for measuring the shape of the mirrors of the Next Generation Space Telescope (NGST) uses a modified version of GS. In the Hubble and NGST applications, the goal is to characterize the time independent phase structure of the optical system. In the case of measuring the NGST optics, effects of the turbulent air in the test facility are averaged over. In various embodiments for a structure function monitor, an opposite approach is used, where the time-dependent fluctuations caused by the atmosphere are of most interest and the shape of the optics used is of rather less interest.

The SFM phase retrieval processing need not be limited to the GS algorithm, and it need not necessarily be an iterative process.

The GS Algorithm recovers the phase across the aperture, but it is insensitive to both the global phase (piston) and to phase differences of more than $2\pi$. The recovered phasemap from the GS Algorithm can be represented:

$$\phi_{GS}=(\phi_P+\text{piston})\bmod(2\pi)-\pi$$

The recovered phases from the GS algorithm, $\phi_{GS}$, are a combination of the true pupil phases, $\phi_P$, plus a global piston offset, wrapped between $-\pi$ and $+\pi$. The wrapped phasemap thus includes numerous $2\pi$ jumps that must be resolved into a continuous function through the process of phase unwrapping. Phase unwrapping is a research field unto itself that has been applied extensively in synthetic aperture radar interferometry, optical interferometry, and medical imaging.

In the case of propagation of optical wavefronts through atmospheric turbulence there are some factors that make unwrapping phase a more straightforward process. Firstly, the phase across an aperture will be continuous. A trivial Huygens Wavelets analysis shows that a sharp discontinuity in a wavefront, such as that cause by the edge of an aperture stop or an abrupt change in index of refraction, is smoothed out in a few wavelengths of propagation. Secondly, the largest contributor to the phasemap will be the overall tip and tilt of the wavefront, due both to turbulence on scales larger than the aperture and motion of the optical system itself with respect to the source. Because these terms appear as a simple plane in the phase map, existing phase unwrapping algorithms perform well and it is apparent when the unwrapping process is unsuccessful. In practice, under strong turbulence when the light in the image plane is spread out so much that it is not measured with appreciable signal-to-noise or when strong scintillation causes the pupil intensity to vanish in some place, the GS Algorithm will inject artifacts (in the form of singularities) in the recovered phasemap that cannot be resolved by unwrapping.

There are many algorithms for phase unwrapping, where a wide variety of the most commonly used algorithms have been compared in the literature. In an embodiment for a SFM, Flynn's Minimum Discontinuity Method (FMDM) may be used for unwrapping the phasemaps produced by the GS Algorithm. See, Flynn, T. J, "Two-dimensional phase unwrapping with minimum weighted discontinuity," Journal of the Optical Society of America A: Optics and Image Science, and Vision, 14(10) 2692-2701, October 1997. FMDM works by identifying lines of phase discontinuity (where the map has been wrapped) and searches for discontinuities that form loops. The pixels inside the loops then have the appropriate multiple of (n×2π) added to them so that the total number of loops is minimized.

In practice, FMDM does an excellent job of unwrapping phasemaps, succeeding in totally unwrapping over 95% of the frames analyzed. In those it does not unwrap completely, it has left at most 6 pixels (out of over 6000) at the edges of the map, caused by the edge of the pupil being discontinuous. Further processing detects and masks off the erroneous pixels. A more rigorous implementation of FMDM, which uses pixel quality maps to help guide the unwrapping, succeeds all of the time. However, the more rigorous implementation costs significantly more in processing time and may be unwarranted given how few pixels are given up in the faster implementation.

Under most real-world atmospheric conditions, the majority of turbulent optical power occurs at spatial scales much larger than the primary aperture of all but the very largest modern telescope systems. Phase variations arising from these large scale disturbances are manifested as tip, tilt and piston fluctuations. Single aperture optical systems are insensitive to piston (overall phase offset) variations. For small telescope systems where the mount is not isolated from ambient vibrations, tip and tilt are indistinguishable from the oscillatory motions of the telescope. For embodiments in which a SFM is designed around small, off-the-shelf telescopes, approaches may be taken so that the effects of telescope motion, which appears as tip and tilt of the wavefront, do not contaminate the phase data. In an embodiment, overall tip and tilt may be first removed from each unwrapped phase map by means of a straightforward linear least-squares fit of a plane to the map. Removing the tip and tilt may be used for calculating the short exposure structure function.

In an embodiment, analysis of the data frames acquired by a SFM device, such as the example SFM device discussed herein, may be performed by an automated software pipeline running under MATLAB™, the bulk of which is compiled code (either internal MATLAB™ routines or compiled C code executed by MATLAB™). Image and pupil cubes are processed in the order that they were acquired and each frame is processed independently and in sequence. The processing sequence proceeds from the GS algorithm, through correction operations of unwrapping, detilting, deflipping, to measuring the time average phase map and final calculation of the parameters relevant to characterizing atmospheric turbulence. Each of these operations, the algorithm used to calculate and apply the operation is described here. Application of automated software is not limited to running under MATLAB™.

Figure 6:
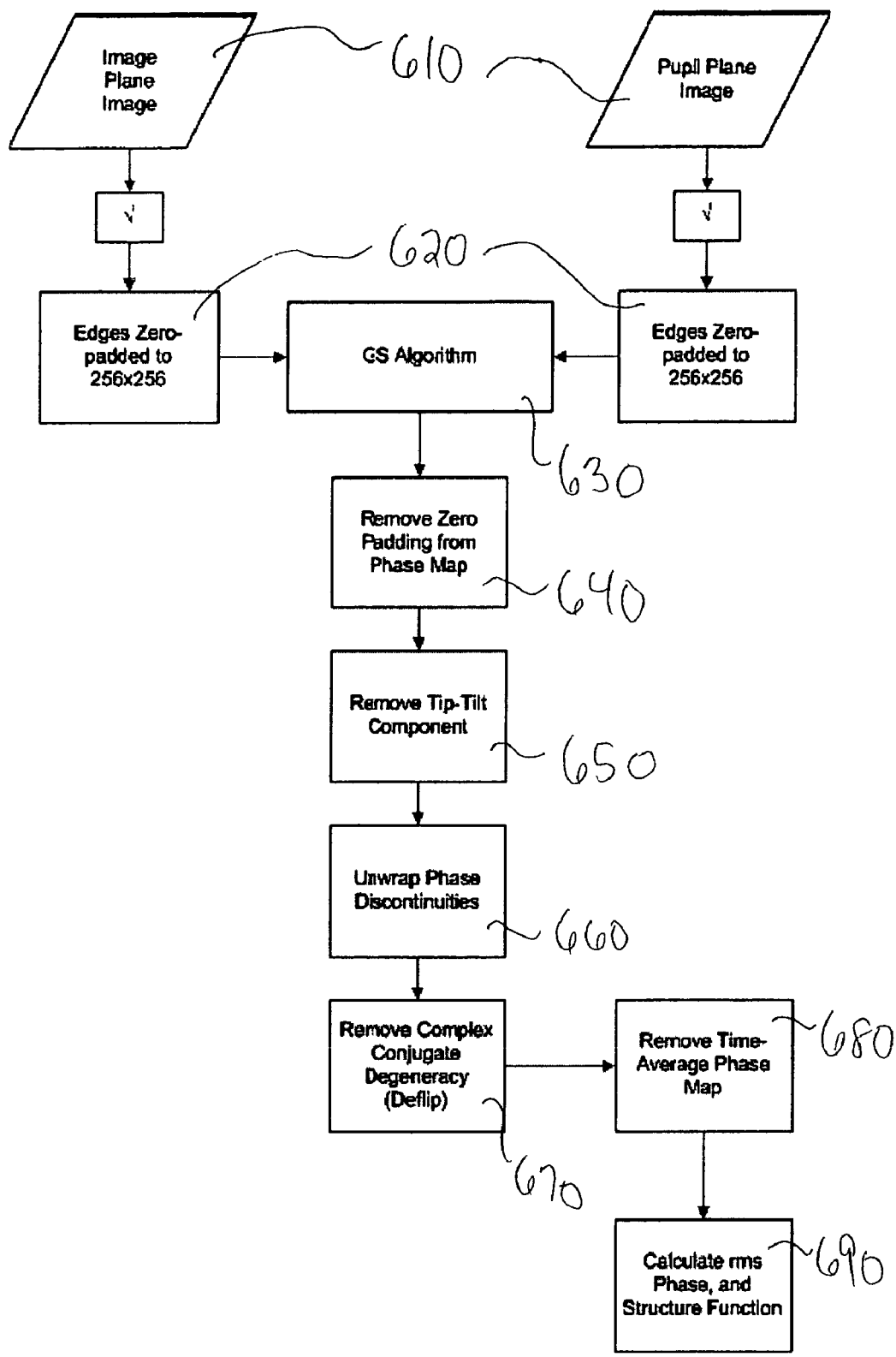
FIG. 6 illustrates features of an embodiment of a method that implements the Gerchberg-Saxton algorithm in a surface function monitor system.

FIG. 6 illustrates features of an embodiment of a method that implements the GS algorithm in a SFM system. For instance, this flowchart shows a data reduction process of the SFM system from the acquired images to the output atmospheric parameters. In an embodiment, the total processing time may be dominated by the GS algorithm, which may take 5-10 seconds per acquired frame. The remaining steps together may take only a small fraction of a second per frame.

At 610, an image plane image and a pupil plane image are acquired. At 620, an initial step includes padding the edges of each the image and pupil arrays, to 256×256. Let $W_I$ and $W_P$ be the complex wave in the image and pupil planes, and similarly for the recorded intensities, $I_I$ and $I_P$, the amplitudes $A_{I,P}=\sqrt{I_{I,P}}$, and the phases $\phi_I$ and $\phi_P$. Superscripts indicate the iteration number. At 630, the GS algorithm is applied. A guess at the pupil plane phases is made. Gerchberg and Saxton suggest a random phasemap for the initial guess, but also acknowledge that the choice of initial phasemap doesn't impact the final solution, other than possibly starting closer to the solution. For azimuthally symmetric intensity maps, such as the example embodiment associated with FIG. 3, one cannot choose a constant phase across the aperture or the algorithm will not converge. It has been suggested to model the source and take the phases of its FFT as the initial pupil phases. In an embodiment, a source is modeled as a Gaussian with diffraction-limited FWHM, $W_I^0$. The initial pupil plane phases, $\phi_P^0$ are then given by:

$$\phi_P^0 = \text{Angle}(\text{FFT2}(W_I^0))$$

where 'Angle' is the MATLAB™ function that computes the complex phase angle (from the arctangent of the quotient of the imaginary part divided by the real part) and 'FFT2' is the internal MATLAB™ 2D FFT implementation using the FFTW 3.0 library. The phases calculated from the MATLAB™ FFTs are also corrected for a problem in the implementation of the FFT that causes the phases to have a checkerboard appearance: the phase of every other pixel is offset by $\pi$. Though there is no note of this effect in the literature, testing simple Fourier transform cases also shows this same phase offset. Correction by subtracting a mask with phases alternating by $\pi$ on a checkerboard pattern yields the proper answer.

With the initial pupil plane phases calculated, the first estimate of the image plane phases and pupil plane phases is obtained:

$$\phi_I^1 = \text{Angle}(\text{FFT2}(A_P e^{i\phi_P^0}))$$

$$\phi_P^1 = \text{Angle}(\text{FFT2}(A_I e^{i\phi_I^1}))$$

Then iterate:

$$\phi_I^{n+1} = \text{Angle}(FFT2(A_P e^{i\phi_P^n}))$$

$$\phi_P^{n+1} = \text{Angle}(FFT2(A_I e^{i\phi_I^{n+1}}))$$

until $$\sum_{x,y \in P} |\phi_P^n - \phi_P^{n-1}| \leq 10^{-3}$$

The convergence criterion of $1.0 \times 10^{-3}$ absolute phase change corresponds to less than one part per million phase change per pixel in the phase image. A value of $1.0 \times 10^{-3}$, obtained empirically, may be used as the value at which GS always converged. Under calm atmospheric conditions, the GS algorithm for the 256×256 arrays will typically converge in 15-25 iterations, which may take about 3-5 seconds on a 2 GHz PC. At 640, the zero-padding around the edges of the frames, which are still zero, are then removed and the arrays are returned to 128×128.

At 650, tip-tilt component may be removed. A plane may be fit to the unwrapped phasemaps using internal MATLAB™ linear least-squares code. The residuals of the fit then become the tilt-removed phasemap. At 660, phase discontinuities may be unwrapped. To unwrap the output pupil phasemap, MATLAB™ may be used to call an outside routine that implements FMDM. Pixels on the edges of some maps that are not successfully unwrapped are detected (by looking for $2\pi$ discontinuities at the edges of the map), masked off, and ignored in further analysis. At 670, complex conjugate degeneracy may be removed (deflipped). The GS algorithm does not distinguish between solutions that are complex conjugates of each other in the case where the input images are azimuthally symmetric. This manifests itself as some of the maps being "flipped", that is, nearly the negative of the previous map. This does not affect instantaneous measurements, but it may have drastic consequences on time averaged quantities. In an embodiment, the sign convention of the first analyzed frame may be adopted. If the rms phase of the sum of two adjacent frames is less that the rms phase of the difference, then the second frame is flipped with respect to the first and multiplied by −1 to remove the effect.

Figure 7:
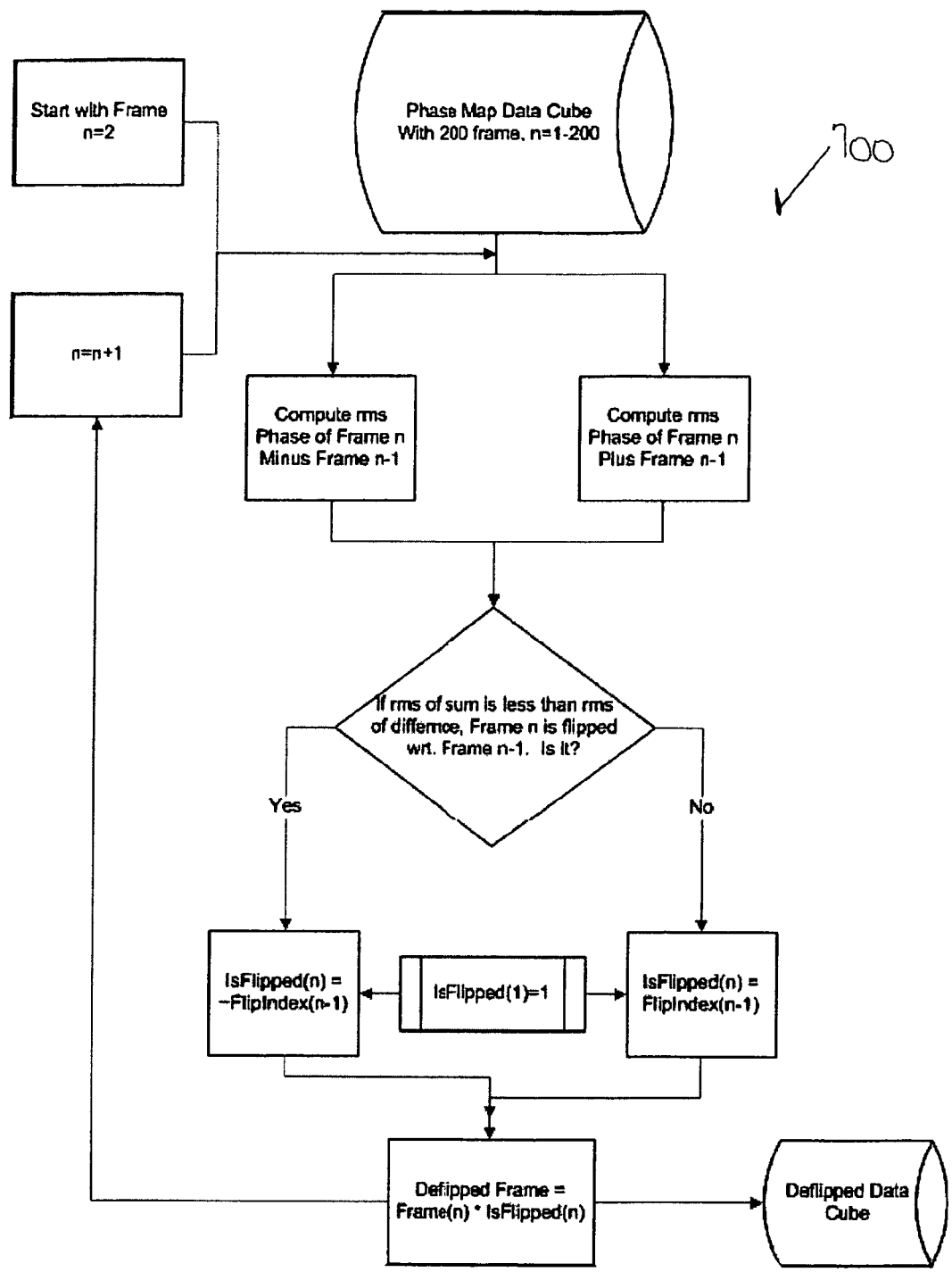
FIG. 7 depicts features of an embodiment of a deflip process in a structure function monitor system.

FIG. 7 shows a flowchart of the deflip process 700. In the case of centrosymmetry of the pupil plane image, as in the case of SFM, two solutions are allowed by the GS algorithm that are complex conjugates of each other. This manifests itself in the recovered phasemaps as a flipping of the frames. This is normally not important, but when calculating the average phase of a data cube and subtracting it, the flipped maps change the average from what it should be. The result is anomalously high rms phases. The deflipping process looks at the rms of the sum and difference of adjacent frames. If the rms of the sum is lower than the rms of the difference, a flip has occurred. The deflipping routine goes through all the frame and flips them to be consistent with the first.

In an embodiment, a SFM may be designed to produce atmospheric turbulent structure characterization parameters. Having retrieved the phase, unwrapped, detilted, and deflipped it, a primary data product is provided:

$$\phi_P(x,y,t)$$

From these values, five other fundamental characterization quantities may be derived:
1) $\sigma_\phi(t)$ is the rms phase over the aperture
2) $D_{100}^{SE}(\rho, t)$ is the short exposure (e.g. tip-tilt removed) structure function.
3) $\Delta_p(x, y, t) = \phi_p(x, y, t) - \langle \phi_p(x, y) \rangle$ is the time-averaged phase removed phasemap shown at 680 in FIG. 6. The motivation for removing the time average of the phasemaps is that the recovered phase has contributions from both the atmosphere and the optical system. On the timescales (10-15 minutes) that are averaged over, the phase aberrations of the optical system can be considered constant. Removing them leaves the rather more rapidly changing effect of the atmosphere. After each autofocus operation, a new average may be calculated.

At 690 of FIG. 6, the rms phase and a structure function may be calculated:
4) $\sigma_\Delta(t)$ is the rms phase over the aperture after the average phase is removed
5) $D_\Delta^{SE}(\rho,t)$ is the short exposure (e.g. tip-tilt removed) structure function after the average phase has been removed.

The single most-used turbulence characterization parameter is the "structure function." In various embodiments, the structure function is a primary product of SFM. The code to calculate the short exposure structure function may be compiled C code that takes the detilted phasemap as input and outputs both the 1D and 2D structure functions. Mathematically the structure function is the variance of the difference in phase at all available separations in the pupil.

$$D_\phi(\vec{\rho}) = \langle (\phi(\vec{x}) - \phi(\vec{x}+\vec{\rho}))^2 \rangle$$

The input phasemap is shifted against itself in both x and y. For each shift, the code calculates the difference between overlapping pixels and finds the variance for all the pixel differences at that shift. For a 128×128 array, the 2D structure function is 255×128. The 2D structure function is then azimuthally averaged to form the 1D structure function, which is a function only of the scalar separation. The code is not limited to compiled C code, but may use other codes to calculate the structure function.

Figure 8:
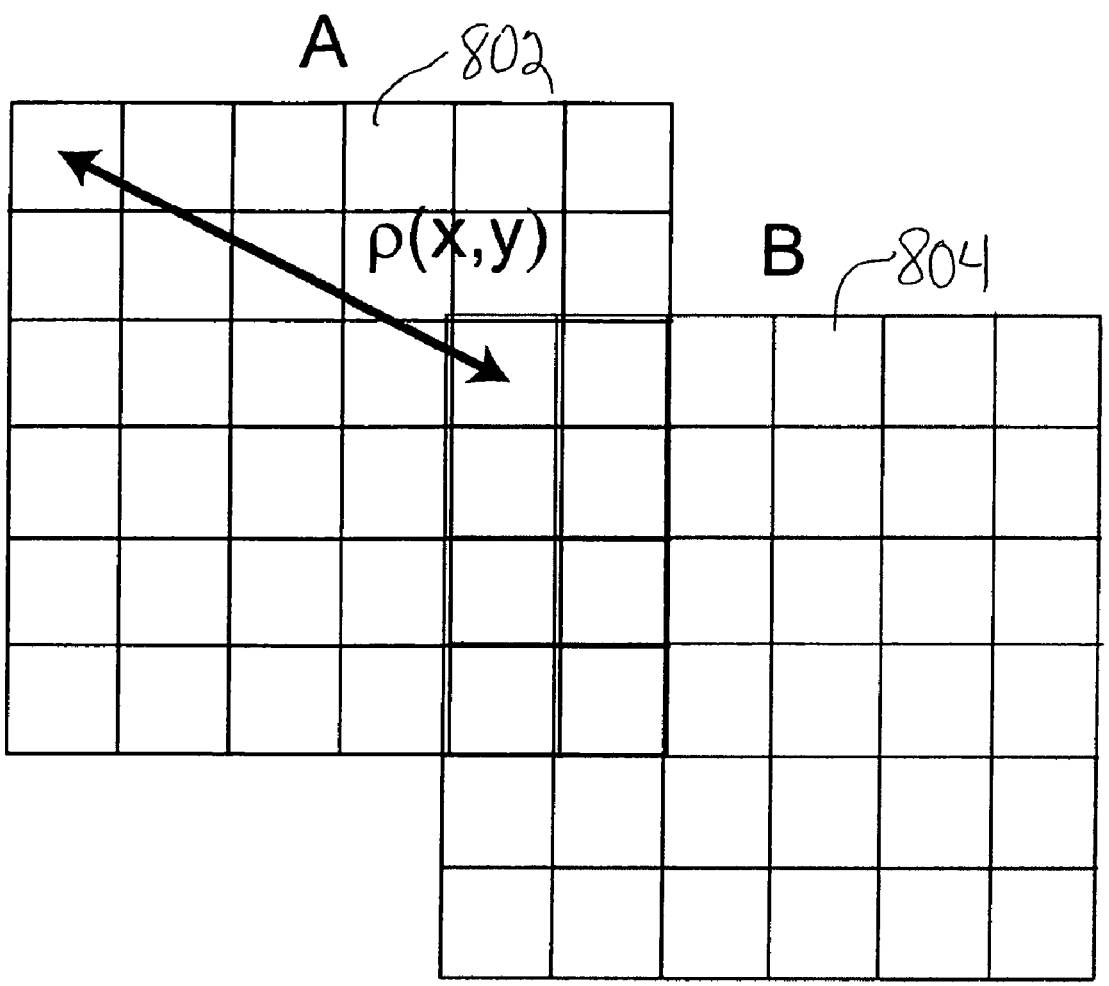
FIG. 8 shows a schematic of an embodiment of a structure function calculation.

FIG. 8 shows a schematic of an embodiment of a structure function calculation. The 2D phase structure function of an array of phase measurements is the variance of the phase differences at a given separation. For the case shown, A & B are identical copies 802 and 804 of the same phase map. The phase structure function at $\rho$ is the variance of the difference in phase at each overlapping point, in this case, it is the variance of the phase difference between the 8 overlapping pixels. The full 2D phase structure function is this same procedure for all realizations of ρ, except that the phase structure function at (x,y)=phase structure function at (-x,-y), and so only half of the full structure function is typically calculated. The 1D radial phase structure function is obtained by azimuthally averaging the 2D structure function centered on the (0,0) offset.

Figure 9A:
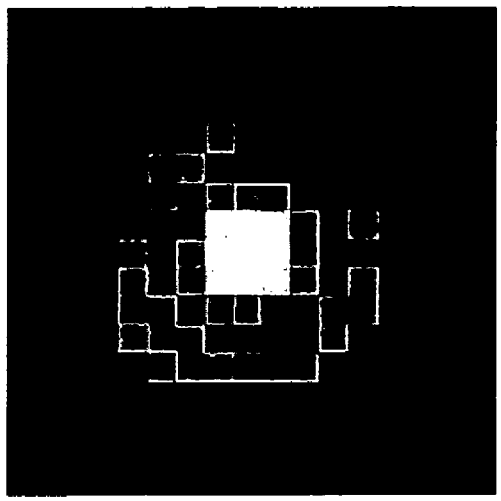
FIGS. 9A-C show the progress of a single set of measured intensity images through an embodiment of a structure function monitor processing.
Figure 9B:
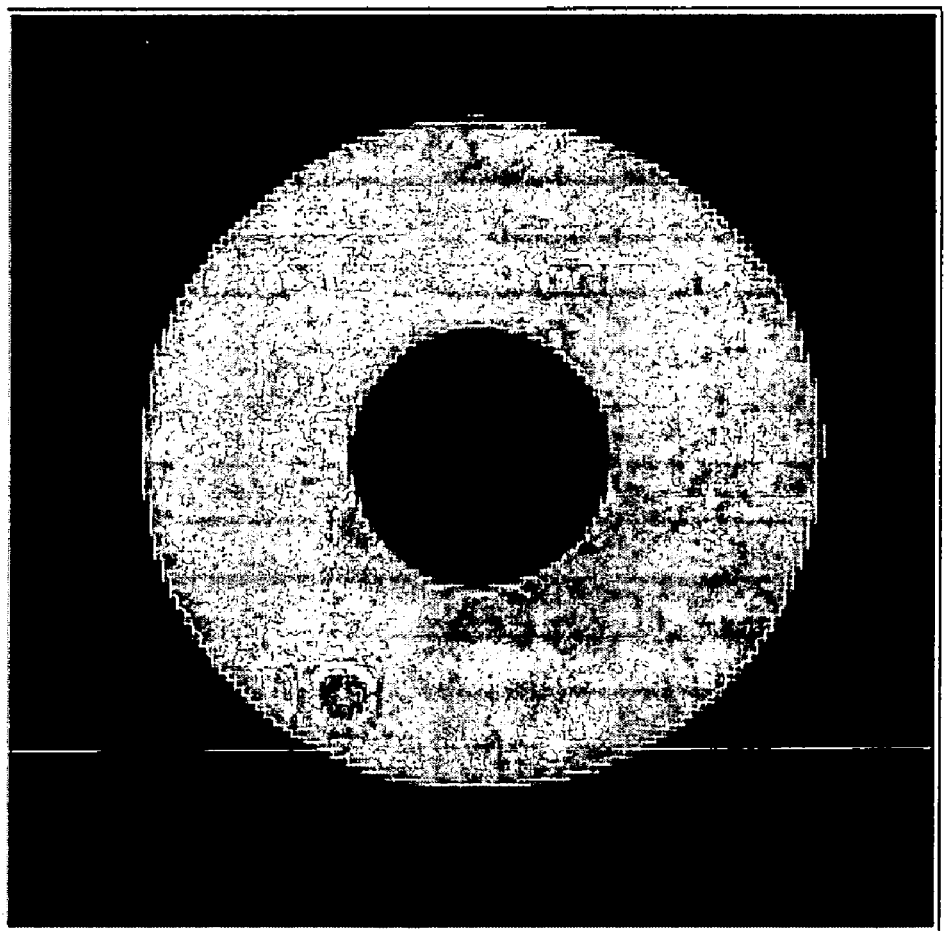
Figure 9C:
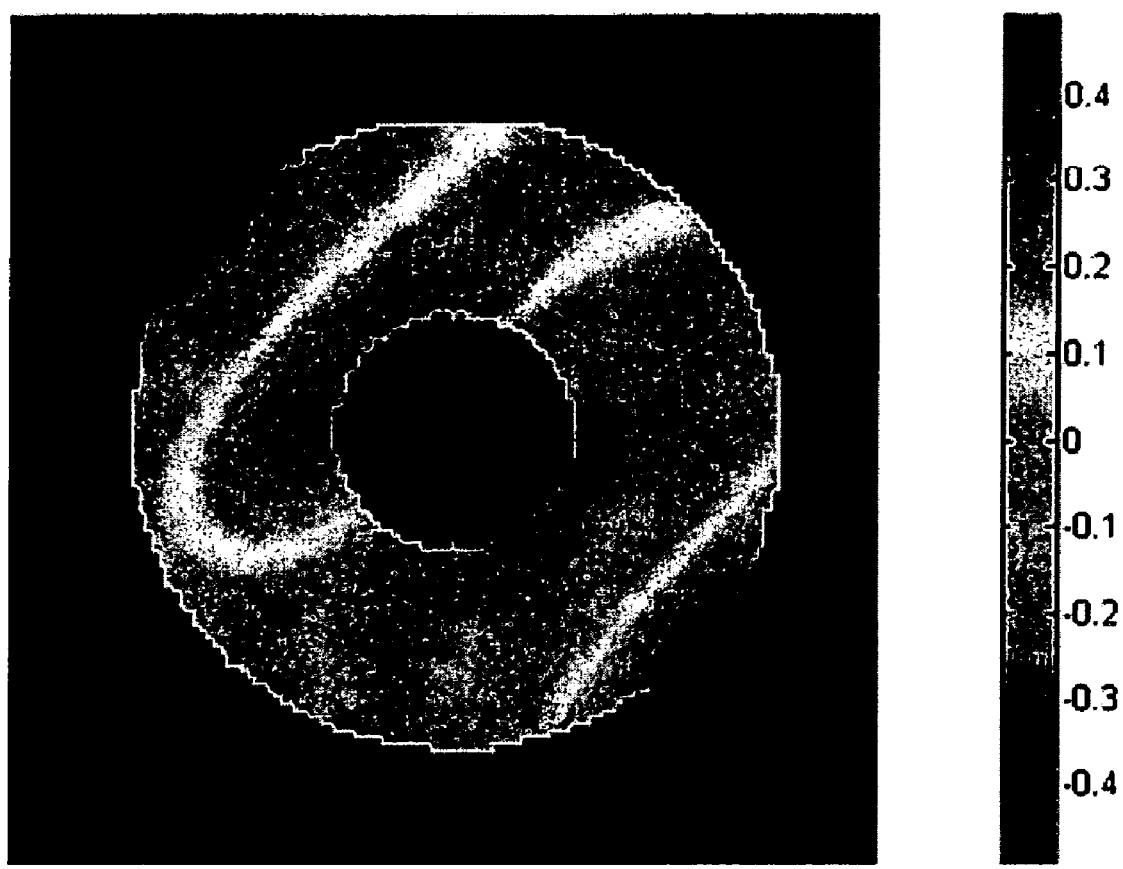
Figure 10:
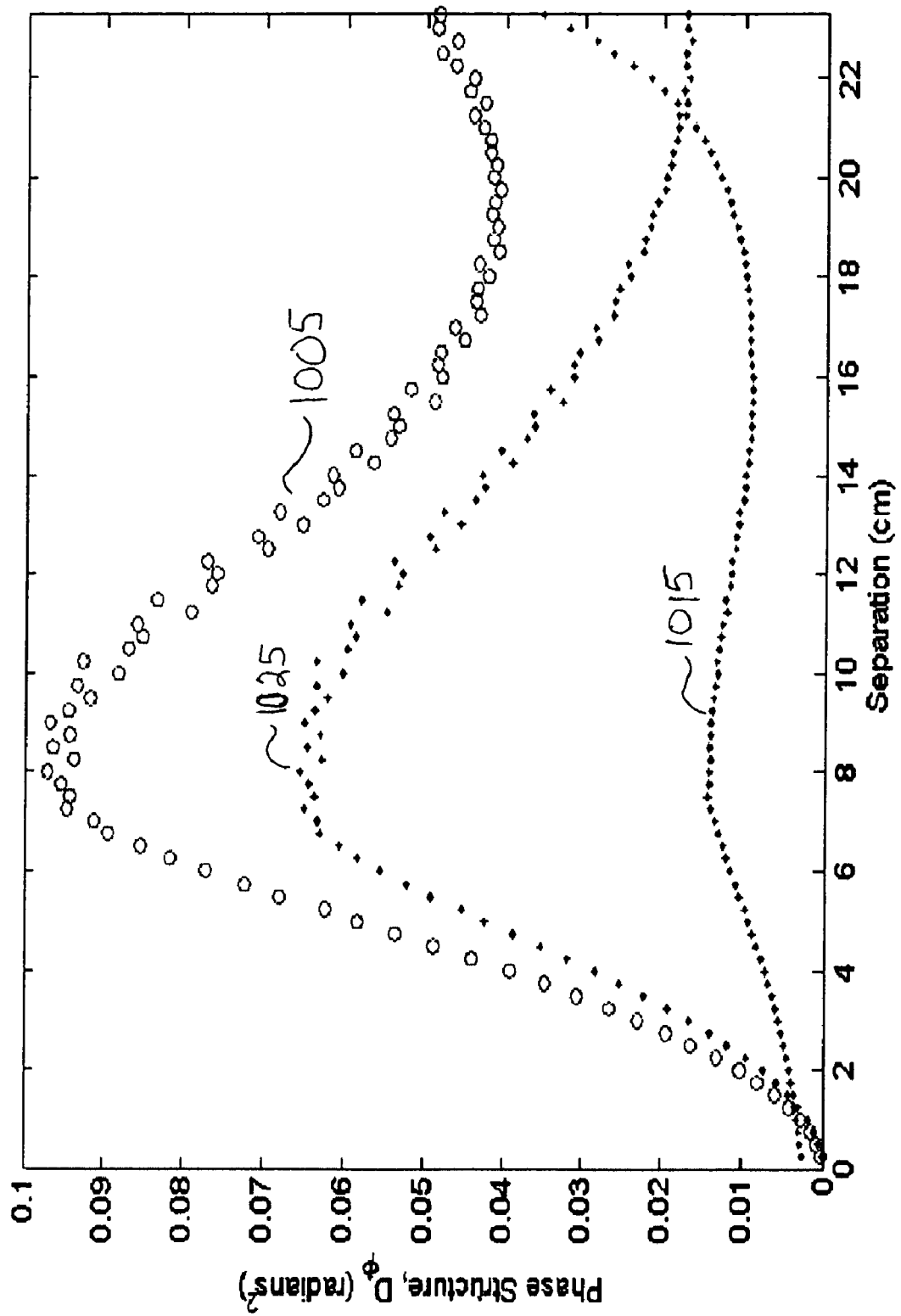
FIG. 10 shows a resulting structure function associated with FIGS. 9A-C.

FIGS. 9A-C shows the progress of a single set of measured intensity images through an embodiment of SFM processing. FIG. 10 shows a resulting structure function and other derived quantities associated with FIGS. 9A-C. The SFM acquires simultaneous images of the image plane and pupil plane, and example of which is shown in the image in FIG. 9A and in the image in FIG. 9B, respectively. FIG. 9C shows the phase map recovered from the images of FIGS. 9A-B in radians. FIG. 10 shows the structure function from these example FIGS. 9A-C, the example map corresponds to the set of points 1005. The set of points 1015 are from the same recovered frame, only in this case the time average phasemap, corresponding to phase variations from the optical system, has been subtracted from the one shown in FIG. 9C. The average phase map's structure function is shown in the set of points 1025.

In an embodiment, the Strehl ratio may be estimated. The Strehl ratio is a useful measure of image quality. It is the ratio of the amplitude of the measured point spread function to that of the diffraction-limited optical system. From the rms phase over the aperture, the Strehl ratio for the SFM map can be calculated trivially as: $S=e^{-\sigma^2}$. The Strehl ratio is a particularly useful metric because it does not depend on a model of atmospheric turbulence.

Figure 11:
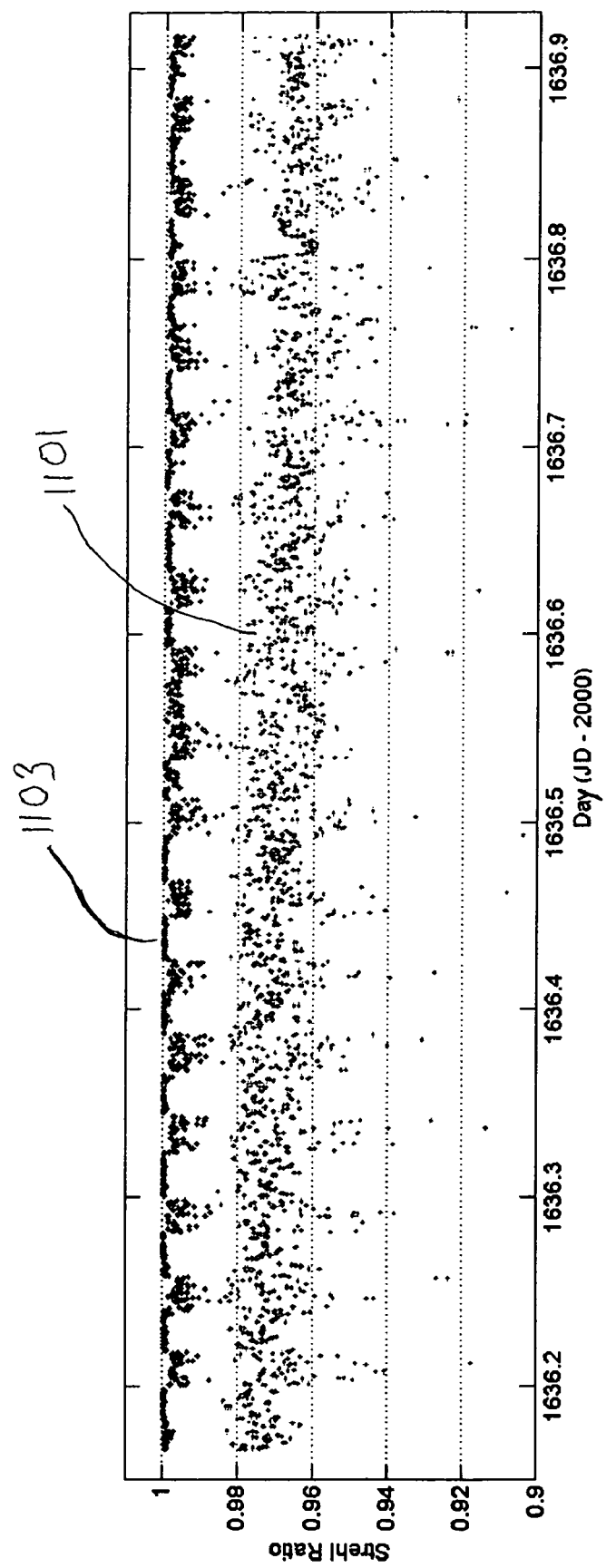
FIG. 11 shows a plot of the Strehl ratio for a structure function monitor.

FIG. 11 shows a plot of the Strehl ratio for a SFM. The set of points 1101 are the raw recovered phase maps without the average phase removed and indicate the overall Strehl for the whole system. The set of points 1103 are the points with the time-average phase removed, so that the remaining phases are indicative of only atmospheric turbulence and not affected by the optical system. The time independent phase contribution always dominates the turbulent contribution to the Strehl ratio, indicating that the phase distortions due to the optical system are considerably larger than the turbulent contributions. During quiescent periods, the Strehl ratio indicates that the optical performance of the SFM is only affected by the optical system. The turbulent contribution during quiescent periods is nearly indistinguishable from diffraction-limited performance, which leads to the conclusion that the SFM in this embodiment lacks the sensitivity to measure turbulence during quiescent periods.

In an embodiment, Fried's parameter may be estimated. Fried's parameter, $r_0$, is the usual parameter for characterizing the size of the mean phase coherent (i.e. diffraction-limited) aperture for the time-averaged turbulence. Interpretation of Fried's parameter as the size of a coherent "patch" depends upon the atmospheric turbulence having a Kolmogorov parent distribution, which is often the case for vertical optical paths through the entire atmosphere, but seldom true for truncated vertical or any horizontal paths.

There are two different ways of estimating $r_0$ from the recovered phasemaps. Fried's approximation for the short exposure structure function depends only on $r_0$. One can therefore fit Fried's expression to measured structure functions. However, as can be see in FIG. 12, Fried's expression does not well represent the recovered phase structure. Fried's parameter can also be related directly to the rms phase across the aperture. Measured values of $r_0$ must be taken with a grain of salt as the entire framework upon which Fried's parameter rests depends on the validity of a Kolmogorov spectrum in the measured turbulence.

Figure 12:
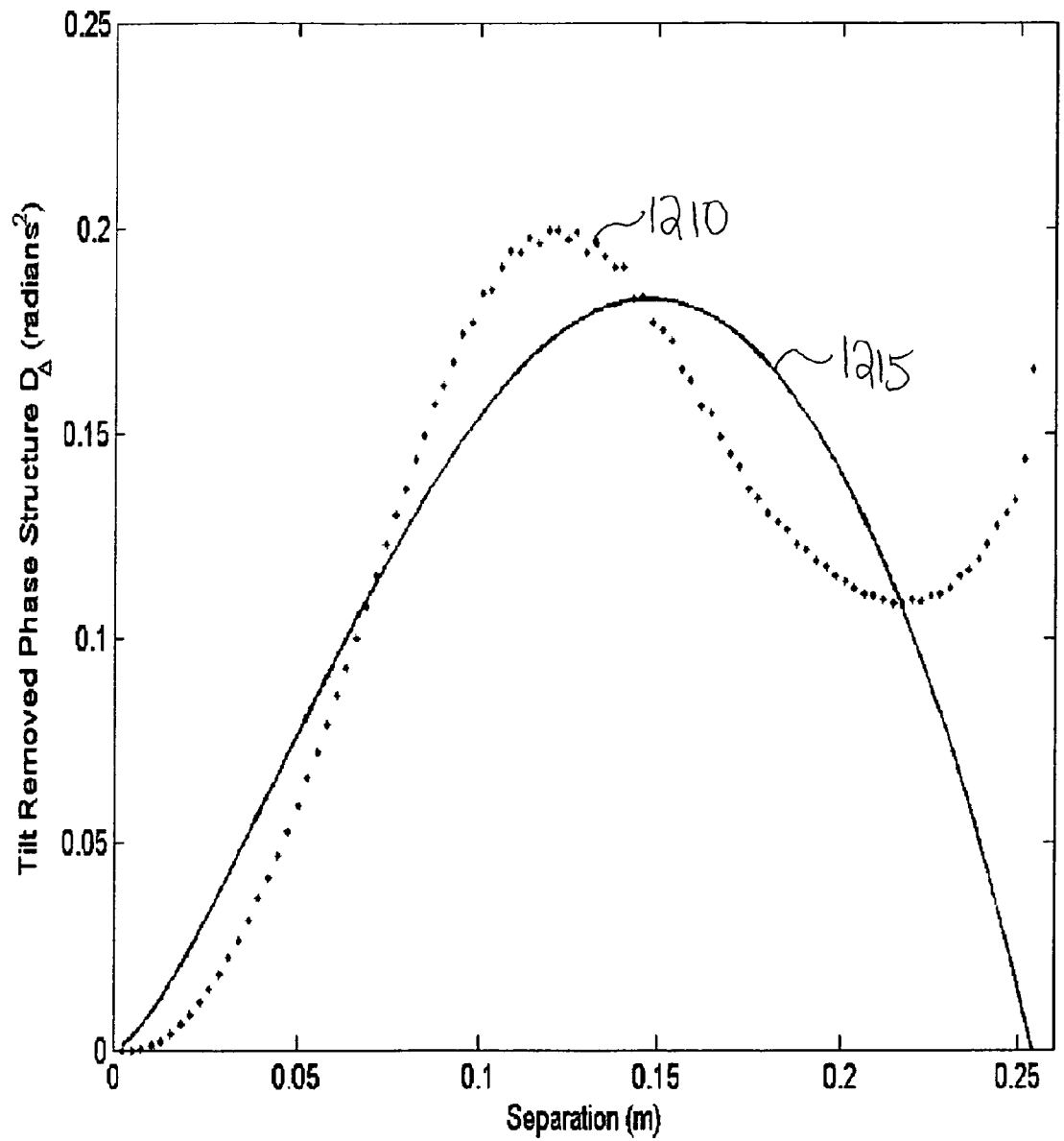
FIG. 12 shows an example of a structure function measured by a structure function monitor.

FIG. 12 shows an example of a measured SFM structure function, the set of points 1210, is shown in contrast with the best fit approximate short exposure structure function 1215 of Fried with $r_0$ of 0.44 m. The discrepancies, especially the underestimations at moderate and large separations, exist in all of the recovered structure functions of the SFM. Similarly shaped short exposure structure functions are predicted in other publications that discuss modeled turbulence using an exact form of the short exposure structure function. However, these exact forms are not amenable to fitting to real data because they are integral equations and have so far only been calculated with numerical integration on supercomputers.

For transmitters at a finite distance from the receiver, the turbulence measured by the SFM receiver has a distance weighting function. Turbulence near the transmitter does not affect the propagating wavefront in the same way as turbulence near the receiver. The net effect is an overall underestimate of the total turbulence in the volume probed and a bias towards turbulence near the receiver. This effect has been quantified in the literature in terms of the integral of $C_n^2$, the range resolved index of refraction structure constant. In the case of a source with finite altitude, the integral becomes:

$$\overline{C}_n^2 = \int_0^L C_n^2(h)\left(1 - \frac{h}{L}\right) dh$$

where formally $$C_n^2 = \langle (n(x) - n(x+\rho))^2 \rangle \rho^{-2/3},$$

and n(x) is the index of refraction at position x, with ρ the spatial separation over which the structure constant is calculated.

If the turbulence in the volume probed can be assumed to be constant (i.e. $C_n^2(h)$ is constant), then the cone effect on measured $r_0$ values can be quantified as:

$$r_0(SFM) = \left(\frac{8}{3}\right)^{3/5} r_0 \cong 1.8 r_0$$

where $r_0$ on the right hand side is the coherence patch diameter of a wavefront from a source infinitely far away traveling through the same region. The assumption of constant $C_n^2$ may never be truly applicable to real world turbulence, especially in the surface layer. Nevertheless, when analyzing SFM data, results that include this correction may be included with the uncorrected results whenever presented.

Turbulence induced refractive power may be distributed along the optical path. This makes segregation of the turbulent components a valuable measurement. An example is the Earth's atmosphere. In an astronomical application, SFM applied both to stars (at essentially infinite distance and outside the Earth's atmosphere) and tower-mounted transmitters at, for example, 30 m altitude resolves the turbulent components and measures the effect of the important surface layer.

Figure 13A:
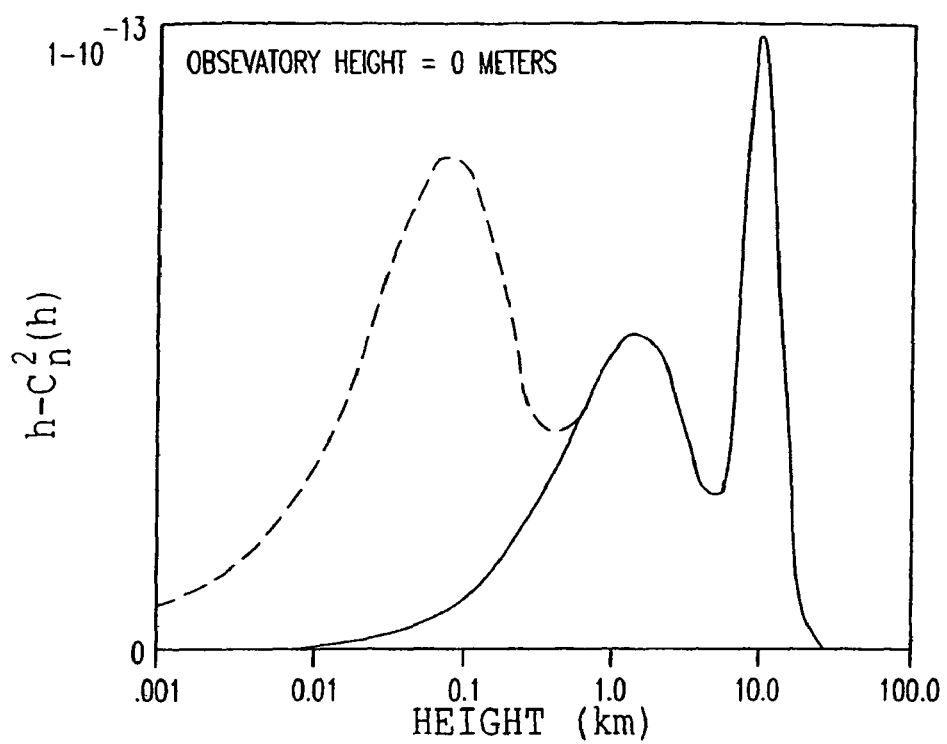
FIGS. 13A-13B show atmospheric turbulence ($h \cdot C_n^2(h)$) plotted as a function of altitude for an observatory at sea level and another at 2630 meters above sea level.
Figure 13B:
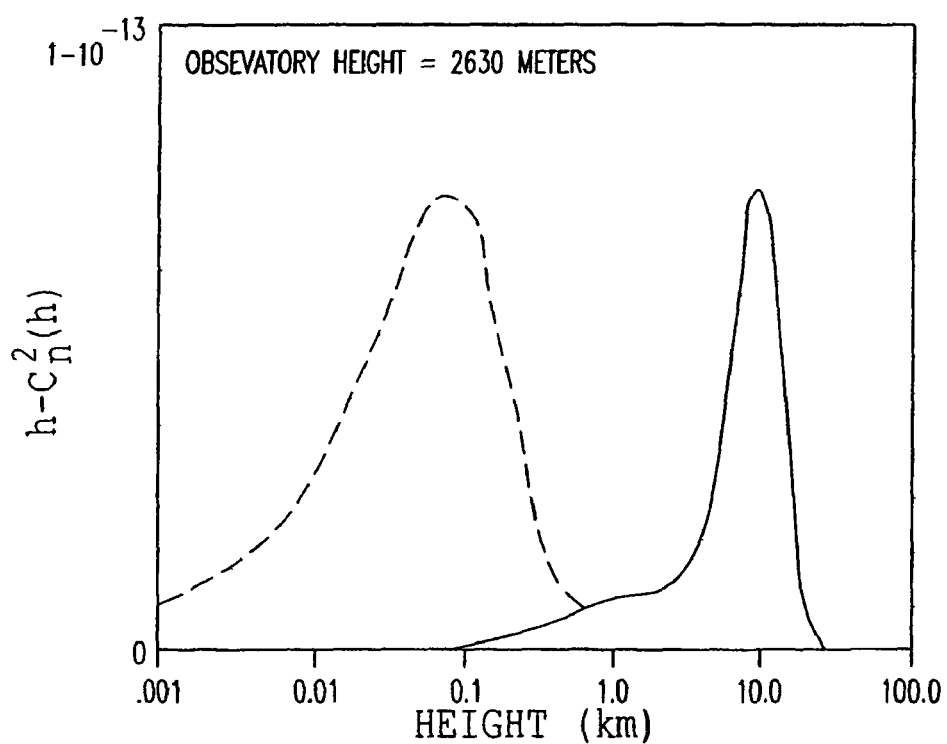

A useful schematic representation of the contribution of atmospheric turbulence, portrayed as the altitude-weighted refractive index structure constant, $C_n^2$, with height is shown in FIGS. 13A-13B (*Diagram from Beckers, J M., "Adaptive Optics for Astronomy: Principles, Performance and Applications," Ann. Rev. Astron. Astrophys.*, 31, 13-62, 1993). The panels in FIGS. 13A-13B show atmospheric turbulence ($h \cdot C_n^2(h)$) plotted as a function of altitude for an observatory at sea level and another at 2630 meters above sea level.

Surface-generated turbulence is shown as the dashed line. The middle peak, which decreases dramatically with increasing altitude, arises from the planetary boundary layer. The approximate altitude at which the planetary boundary layer turbulence contribution is equal to that typically created by a surface layer occurs at an altitude of about 2135-m. Higher observatory sites are less affected by planetary boundary layer turbulence. As noted, there are three conceptually separate physical contributions to atmospheric turbulent structure, distributed in altitude, and represented by the three peaks in FIGS. 13A-13B. FIG. 13A represents a sea level observatory and FIG. 13B represents another observatory at 2630-m altitude. There is overall less turbulence, represented as the integral of these curves, at the higher site. In particular, compare the middle peak of each panel (~1-km altitude) and note the dramatic decrease in turbulence with increasing altitude.

Figure 14:
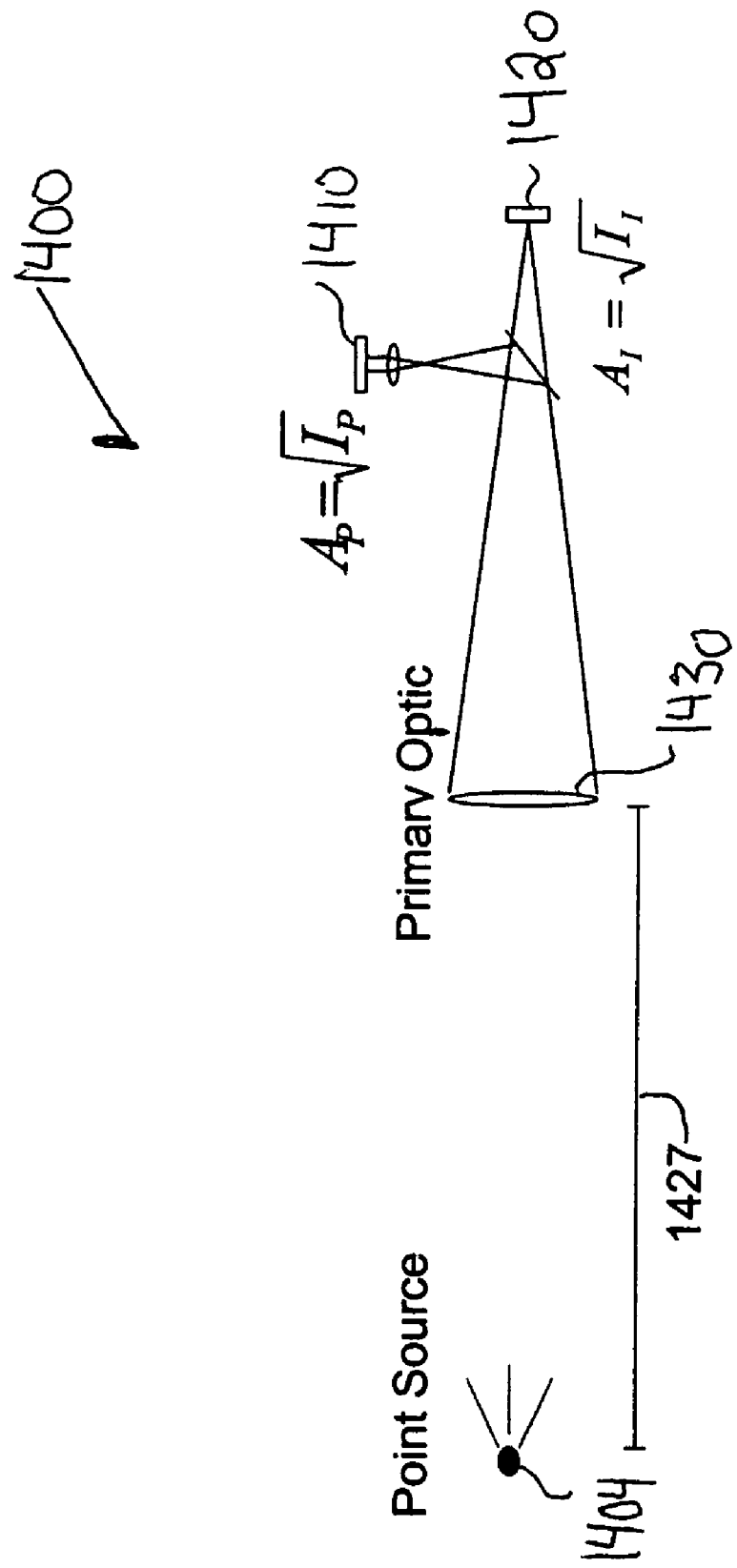
FIG. 14 shows a block diagram of features of an apparatus for measuring turbulence in the atmosphere.

The surface layer can contribute 50%+ of the total $C_n^2$. However, it is apparent that not all telescopes can be built in Hawaii or Chile to reduce such effects. In various embodiments telescopes may be enhanced in design and operation based on information about the surface layer to account for or reduce surface layer effects. FIG. 14 shows a block diagram of features of apparatus 1400 for measuring turbulence in the atmosphere. Apparatus 1400 includes source 1404, detectors 1410, 1420, and primary optic 1430, where source 1404 and primary optic 1430 may be separated by a distance 1427. In an embodiment, distance 1427 may range from about 10 m to about 100 m. Other separation distances are possible. Source 1404 may be a laser or an LED and unresolved by optics. In an embodiment, for a 25 cm optic at about a 10 m separation distance, source 1404 may have a spot size less than or about 50 μm. Various detectors may be used as detectors 1410, 1420. In an embodiment, detectors 1410, 1420 include Epix SV2112 CMOS Cameras, which captures simultaneous 128× 128 subframes at 200 Hz for the image ($I_I$) and pupil ($I_P$) plane. Embodiments are not limited to use of a particular detector/camera or vendor. The images may be analyzed by applying a GS algorithm to recover a phase, unwrapping the phase to minimize phase discontinuities with a global cost function, detilting the unwrapped phase, and calculating a phase structure function. The GS algorithm may be applied to a FFT model of source 1404 to obtain a first phase estimate, $\Phi_P^1$, and then iteratively determine the phase until a desired phase error condition is achieved. Phase unwrapping may be performed by applying a known algorithm. Detilting the unwrapped phase may include a best fit plane subtraction. The phase structure function may be calculated for the entire aperture of interest and azimuthally average to obtain 1D Phase Structure Function.

Figure 15A:
FIGS. 15A-C show sample results of image plane intensity, pupil plane intensity, and recovered phase for a configuration as illustrated in FIG. 14.
Figure 15B:
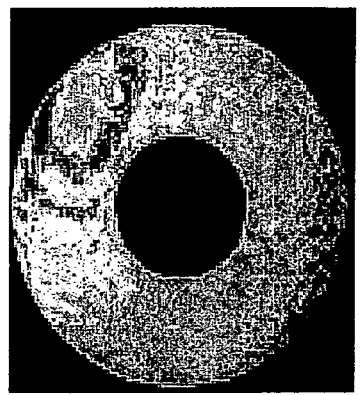
Figure 15C:
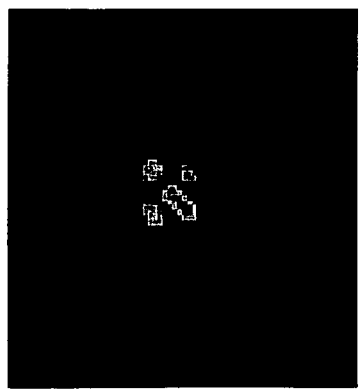
Figure 16:
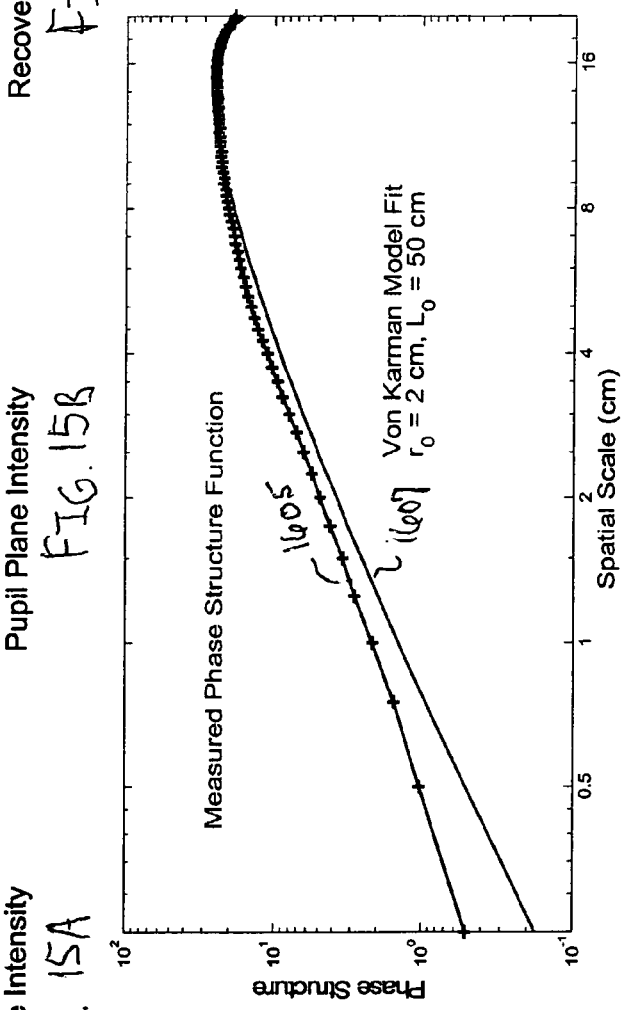
FIG. 16 shows a measured phase structure function with respect to a Von Karman model fit, relative to the sample results of FIGS. 15A-C.

FIGS. 15A-C show sample results of image plane intensity, pupil plane intensity, and recovered phase for a configuration as illustrated in FIG. 14. FIG. 16 shows a measured phase structure function 1605 with respect to a Von Karman model fit 1607 with $r_0$=2 cm and outer scale length $L_0$=50 cm, relative to the sample results of FIGS. 15A-C.

SFM may be combined with other techniques of characterizing the surface layer. Such combinations may enable decisions about telescope and enclosure design, telescope siting both horizontal and vertical, and telescope operation. Information regarding seasonal, daily, and real-time operation may include queued observing selection criteria, and local seeing quality factor. Various embodiments may include combining a SFM with a SDIMM and/or microthermal probes. See Zimmer, P. C., "THE PATTERN SPEEDS OF M51, M83 AND NGC 6946 USING CARBON MONOXIDE AND THE TREMAINE-WEINBERG METHOD & NOVEL TECHNIQUES FOR THE CHARACTERIZATION OF OPTICAL TURBULENCE IN THE SURFACE LAYER" PhD Dissertation, University of New Mexico, October 2004, which is incorporated herein by reference. In an embodiment, the two Source Differential Image Motion Monitor (2SDIMM) measures the apparent separation of a pair of transmitters suspended from the top of a tower, extending the traditional Differential Image Motion Monitor concept to surface layer studies. In an embodiment, the Structure Function Monitor (SFM) adapts the Gerchberg-Saxton phase retrieval algorithm to the recovery of the phase of the incoming wavefront from an artificial source across the aperture of a small telescope. From the wavefront phase, all relevant atmospheric turbulence parameters can be obtained on all spatial scales available to the aperture.

Novel instrumentation and techniques, such SFM and combination of SFM with SDIMM and/or microthermal probes, may allow informed decision making in the design and siting of small (<4 m) diameter telescopes at existing and planned observatory sites. Often, these decisions are dictated by non-scientific constraints, such as cost, logistics and politics. For potential telescopes sites that are geographically separated by less than a few kilometers, turbulent atmospheric effects above 100 m in altitude will be nearly the same. Overall imaging performance of such sites may differ in the contributions of the surface layer. Moreover, the surface layer is the portion of the atmosphere over which one has some control and it is the portion of the atmosphere in which ground based telescopes are built. Various embodiments of the apparatus and techniques discussed herein may be applied to measuring atmospheric turbulence in the first 30 m of the surface layer.

To date, every atmospheric turbulence characterization technique, short of full wavefront sensing such as that accomplished with adaptive optics systems on large telescopes, is fundamentally limited in how it converts its measured quantities into real atmospheric parameters. Most techniques measure turbulence on one or at best a few spatial scales and several of the most common techniques measure non-optical physical quantities, all of which must be converted into atmospheric parameters via model dependent methods. These models are based on assumptions that most likely never hold in the surface layer. In various embodiments, application of SFM may be implemented stressing model-independent measurements.

Because there are several physical mechanisms creating turbulence in the surface layer, such as time-dependent terrestrial thermal heating, orographic flows, and directionally-dependent surface friction, it cannot be expected to closely follow a simple model, such as the momentum cascade that creates a Kolmogorov spectrum. An approach may include making multiple, complementary and supplementary measurements that characterizes the atmosphere in terms of data sets. In various embodiments, the instrumentation to make these measurements is sufficiently inexpensive and robust that multiple systems can be deployed at potential telescope sites, and long-term data streams can be directly compared to select the optimum site.

The 2SDIMM, while very sensitive to turbulent effects along its optical paths, only measures turbulence on a single spatial scale. This limitation is critical in studies of the surface layer, because the turbulence is expected to deviate from model predictions. While the 2SDIMM can be extended to more than two sources, the practical number of DIMM apertures that can be placed on a small telescope is only a few. Similar modifications can be made to microthermal probes to test multiple spatial separations simultaneously, but become impractical with more than a dozen probes per altitude increment. It is desirable, therefore, to develop techniques that measure turbulence on as many scales as possible.

The techniques that come closest to direct measurements of the amplitude and phase of a wavefront over a telescope aperture, such as the wavefront sensors used for adaptive optics, yield the most direct information about atmospheric turbulence possible. It is ultimately these phase variations that degrade ground-based astronomical images. Simultaneous, continuous knowledge of the amplitude and phase of the electromagnetic wave over an aperture is a significant goal of imaging optics.

The effect of optical elements at and subsequent to the pupil is to superpose the amplitude and phase of the complex electromagnetic wave in the pupil to produce an image in another plane. The process of image formation is a Fourier transform and thus the bounded electromagnetic wave in the pupil and the resulting wave in the image plane are Fourier conjugates. Thus, perfect knowledge of the amplitude and phase of the electromagnetic wave in the pupil corresponds to perfect knowledge of the amplitude and phase of the wave in the image plane, and vice versa.

This relationship is difficult to achieve in practice because measurements of optical and infrared radiation are almost always photon counting, or intensity measurements: the phase information is lost, because only the squared amplitude of the complex wave is retained. This is generically known as the "phase problem" and overcoming it is known as "phase retrieval."

In various embodiments, the Structure Function Monitor may be designed to leverage a well-known method of phase retrieval to recover the phase of the incoming wave across the aperture from intensity measurements made simultaneously in the image and pupil planes. From a map of the phase, all atmospheric quantities can be obtained on spatial scales of the diameter of the aperture and smaller.

In an embodiment, a SFM uses the GS phase retrieval algorithm to recover an estimate of the phase of incoming wavefronts, originating from an artificial point source, from simultaneous rapid images of the intensity distributions in the image and pupil planes of a small telescope. From the recovered phase maps, the phase structure function of the phase changes caused by atmospheric turbulence, which relates directly to the optical transfer function, can be computed directly for all spatial scales up to the diameter of the aperture. The ability of the SFM to measure turbulence on multiple scales is its key advantage over other turbulence characterization techniques. Similar techniques that use wavefront sensors, such as those commonly used in adaptive optics, require a considerably larger investment in equipment and are not well-suited to field testing.

Testing of the SFM in parallel with microthermal and 2SDIMM systems shows that it is capable of detecting the same turbulence as these other techniques, albeit with overall lower sensitivity, which is traded for better spatial sampling. Comparisons of the resulting atmospheric parameters are complicated by the model dependencies in the conversion of measurements into common atmospheric parameters. However, the results are consistent with a turbulence spectrum that has significantly less energy at scales of 1 m or larger than is expected in the models, which, in laboratory tests, is consistent with air motions in an enclosed space. The temporal correlations between the three systems are excellent.

Figure 17A:
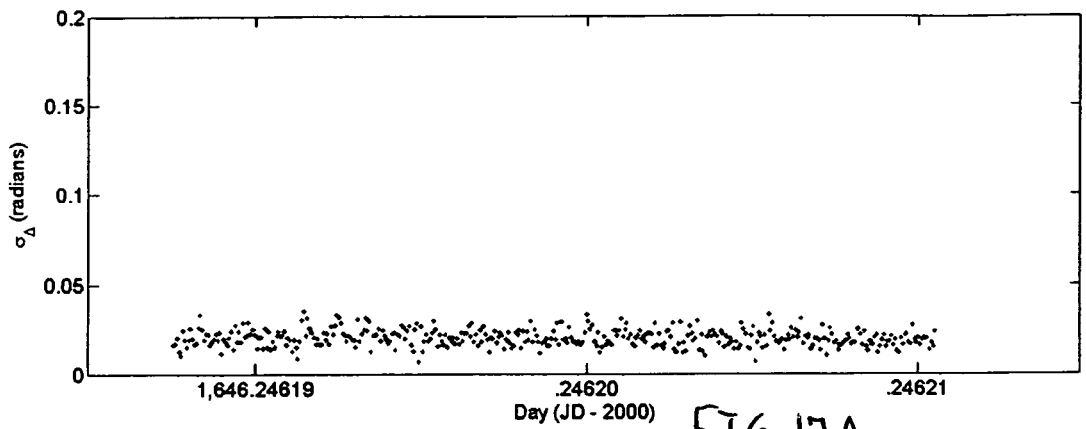
FIGS. 17A-C show an examples of average-subtracted rms phase for two second long data cubes for a structure function monitor taken before, during, and after turbulence is induced.
Figure 17B:
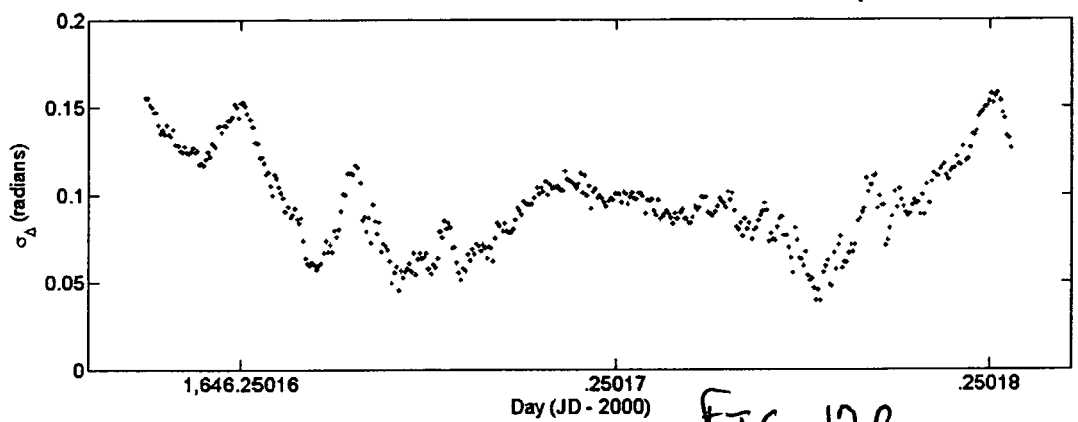
Figure 17C:
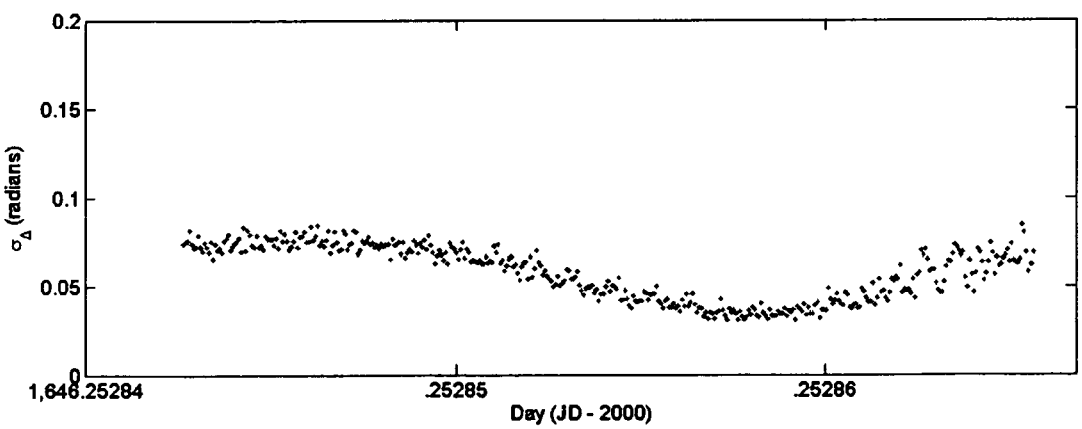

FIG. 17A shows an example of average-subtracted rms phase for two second long SFM data cubes taken before turbulence is induced. FIG. 17B shows an example of average-subtracted rms phase for two second long SFM data cubes taken during the time in which turbulence is induced. FIG. 17C shows an example of average-subtracted rms phase for two second long SFM data cubes taken after turbulence is induced.

Figure 18:
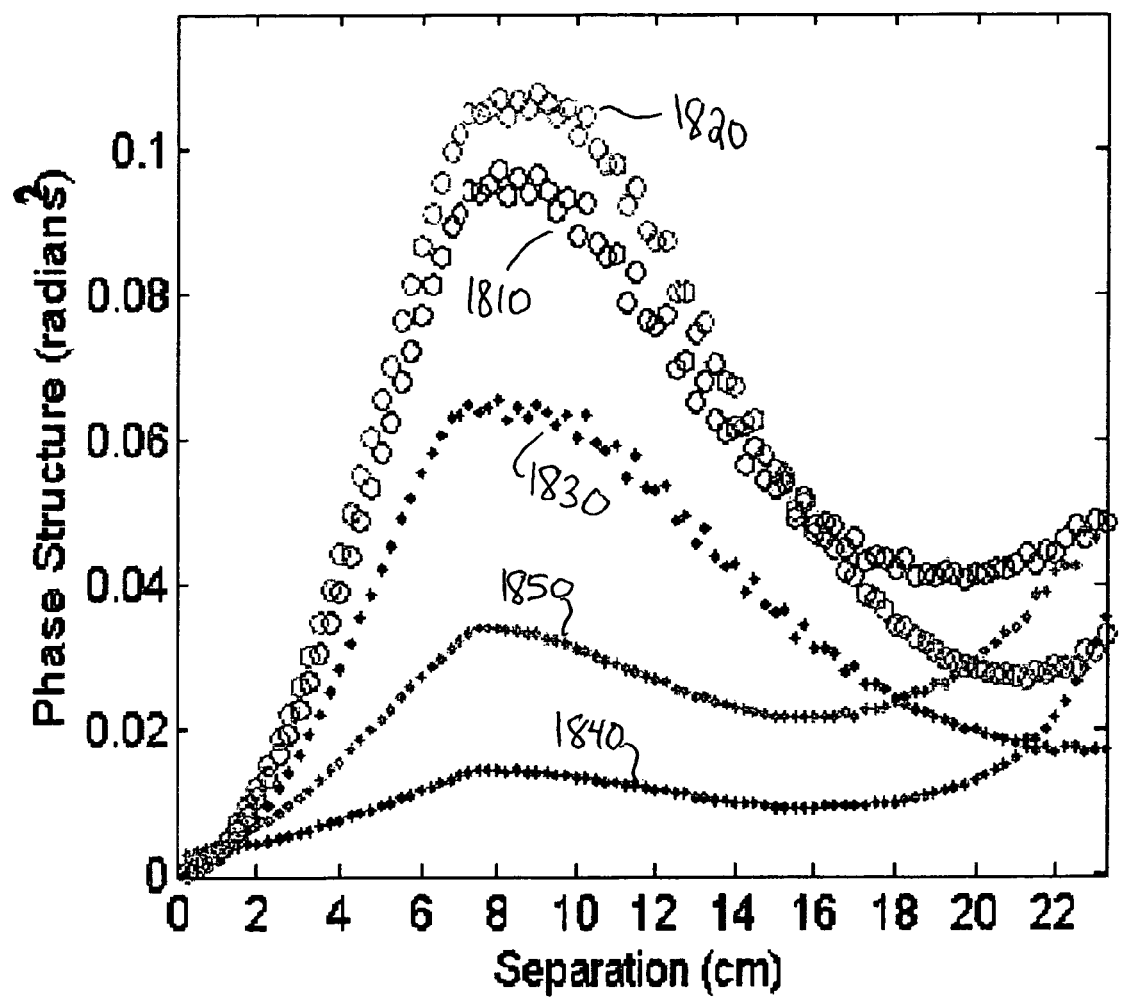
FIG. 18 shows a comparison of structure functions obtained before and during fan induced turbulence.

FIG. 18 shows a comparison of structure functions obtained before and during fan induced turbulence. The set of points 1810 are from the recovered tilt-removed phase map obtained before fan induced turbulence. The set of points 1820 are from the recovered tilt-removed phase map obtained during fan induced turbulence. The set of points 1830 are from the time-averaged phase map, which is taken to be the phase due to the optical system. The set of points 1840 are from the recovered tilt-removed phase map obtained before fan induced turbulence with the time-averaged phase map 1830 subtracted from the recovered map. The set of points 1850 are from the recovered tilt-removed phase map obtained during fan induced turbulence with the time-averaged phase map 1830 subtracted from the recovered map.

FIG. 18 compares the radial structure function for two phasemaps, one during a quiescent period and one while the fan is generating turbulence in the test space, with and without the average phase map removed. The turn-up in phase structure near the edge of the aperture at large separations is predicted in an exact short exposure structure function (See, Tuttle, C. E., "MULTIPLE-CORE OPTICAL FIBERS FOR STELLAR INTERFEROMETRY," Ph.D. Dissertation, The University of New Mexico, 2000), but not in the approximate form of Fried (See, Fried, D L., "Statistics of a Geometric Representation of Wavefront Distortion," Journal of the Optical Society of America, 55(11), 1427-1435, November 1965). Unfortunately, no other approximate form is available and the exact form is not conducive to fitting. It is useful to note, though, that the upturn of the measured structure functions at large separations indicates that the turbulent power on large scales is still increasing out to the limits of the scales available to the 0.25 m SFM aperture. Without a more appropriate approximation to the short exposure phase structure function, however, the true spatial dependence of the phase structure function cannot be determined.

Applicability of a SFM to field use may be determined by both the sensitivity of the detectors it uses and the computational requirements of retrieving phasemaps from the data it produces. Enhancement of a SFM system for field use may be directly related to improvements of standard components used in the system. Commercial improvement in detectors and computational resources, such as faster computers or a computing cluster such as dedicated FFT processors, will provide enhanced SFM performance. In example embodiments, EPIX CMOS cameras may be used as they are inexpensive and can be read out very rapidly. However, the low quantum efficiency, low pixel fill factor, low dynamic range and high read noise of these devices inhibit high precision, high resolution phase measurements. Because CMOS devices cannot be binned at readout, the pupil image scale is fixed by the availability of suitable lenses for the pupil imager. The spatial frequencies of the phase changes in the recovered phasemaps are limited by the sampling of the image plane and the dynamic range of the image plane imager. Points in the image plane further from the central peak intensity correspond to higher spatial frequency information in the recovered phase maps. Because the dynamic range of the EPIX CMOS cameras is 10 bits (1024 levels of digitization), portions of the image plane image with intensity less than 0.1% that of the peak (3% amplitude) are not measured. Detectors with lower noise, higher sensitivity and higher dynamic range (16 bits per pixel-65000 levels) may measure these fainter portions of the image plane and allow recovery of much more detailed phasemaps.

A second factor for a SFM device is the computation time required to generate phase data from the input intensity measurements. In an example embodiment discussed herein, each frame currently takes between five and ten seconds to process. One second of continuous data takes 15-45 minutes to completely process on a 2 GHz-class PC, which converts to roughly one day of processing time per minute of acquired data. The computational load is almost entirely due to the computation time of each FFT in the GS algorithm which is of the order 50 ms for a 256×256 array. Binning detectors would allow smaller arrays to be used in the computation and more favorable pupil image scales could be used. Use of 128×128 pixel arrays would improve computational speed by a factor of better than 5 (4×1 n(4)). In an embodiment, one or more dedicated FFT processing PC boards may be employed, which may provide improvements in operation. Using processors that can perform a 256×256 pixel complex FFT in less than 50 μs would enhance operation to such a point that the processing may be limited by other computing operations. A combination of enhanced detectors and dedicated processing hardware may improve performance to near real-time with possible 50% real time processing (one second of data would take two seconds to analyze).

In an embodiment, enhancements to a SFM technique may use very bright stars as a source. Currently, because a large number of pixels in the pupil image need to be illuminated, using SFM on stars is impossible unless this factor is taken into account. In the literature a theoretical wavefront sensor is described that uses a generalization of the GS algorithm to retrieve phase using only the image plane intensity and knowledge of the shape of the pupil. See, Cederquist, J N., et al, "*Wave-front phase estimation from Fourier intensity measurements,*" *Journal of the Optical Society of America A (Optics and Image Science)*, 6(7) 1020-6, July, 1989. Because amplitude fluctuations are overall much less important than phase fluctuations to image fidelity, the pupil intensity is allowed to vary, though its geometry is bounded and the phase can still be recovered. With this technique as a guide, SFM may be modified to measure the pupil intensity much less frequently than the image plane intensity. Coupled with higher sensitivity detectors, this would allow for sources ten thousand to a hundred thousand times fainter than the current transmitters to be used with improved SFM receiver setup.

In an embodiment, a SFM acquires images of the pupil plane and image plane of a small telescope observing a bright artificial point source located away from the telescope. In an embodiment, the separation distance may be about 30 m. From these images, the phase over the aperture is retrieved, unwrapped and analyzed to yield atmospheric parameters measured at all spatial scales from zero to the diameter of the telescope used. A current example implementation of SFM provides a proof-of-concept. Enhanced performance of the SFM will accompany improvements in component CCD detectors and data processing power. Improved detectors will enable higher sensitivity imaging in the image plane, opening up higher spatial resolution phase maps and lowering the errors in rms phase over the aperture due to detector noise. Dedicated FFT processing hardware may speed up the data processing pipeline by as much as a factor of 1000. Embodiments of apparatus and methods for implementing a surface function monitor are not limited to the components of the embodiments discussed herein.

Various embodiments for a device, referred to as a structure function monitor, that detects and characterizes turbulence in the atmosphere may have a variety of applications. Embodiments for a structure function monitor may be applied in any refractive medium (e.g. air, water). A structure function monitor may measure the perturbation of the wavefront at the pupil (almost always the entrance aperture of an imaging device such as a telescope) over the entire pupil. A structure function monitor may measure perturbations on all spatial scales defined by the aperture. A structure function monitor may operate from low to very high speed to provide real-time wavefront characterization. In an embodiment, a structure function monitor may operate at rates greater than 200 measurements per second. The output from a structure function monitor may be used to calculate several relevant physical characterization parameters for the detected turbulence, including the structure function. Parameters calculated from data acquired by the structure function monitor may be turbulence model dependent or independent. The structure function monitor may use a transmitter and a receiver, where the transmitter may incorporate a sufficiently bright unresolved (point) source. The transmitter for a SFM may be adapted as a natural sufficiently bright point source, such as a star. The transmitter need not be a point source.

In an embodiment, a receiver for the SFM may be a telescope. A receiver may measure images at two Fourier conjugates. A receiver may measure images at the focal plane and a pupil plane, which are Fourier conjugates of each other. A receiver may use an appropriately selected beamsplitter to direct energy from a transmitter simultaneously to the two conjugate planes. A receiver may use an automatic system to maintain focus in the two conjugate planes. A receiver may use area-format detectors to record the conjugate images. A receiver may use two area-format detectors to separately and simultaneously record data in the image and pupil planes. A receiver may use optical bandpass filters to optimize the signal-to-noise performance of the structure function monitor and maintain measurements within the dynamic range of the detectors. A receiver may use a Fabry lens to image the pupil plane onto an area-format detector at the correct image scale. A receiver may use an appropriately selected Fabry lens to adjust the pupil plane image scale on an area-format detector.

In an embodiment, a structure function monitor measures the refractive medium induced wavefront phase errors over the entire aperture. The refractive medium may be the atmosphere. A structure function monitor may use a software data acquisition system to control the transmitter and receiver. The data acquisition system may operate at rates high enough to make real-time measurements of turbulence. A structure function monitor may detect turbulence in real-time. A structure function monitor may characterize turbulence in real-time. A structure function monitor may provide wavefront phase correction data in real-time. A structure function monitor may use a data analysis system. The data analysis system may calculate turbulence parameters. The data analysis system may calculate wavefront phase corrections for imaging purposes. The data system may calculate real-time phase corrections for imaging purposes.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used.

What is claimed is:

1. A method comprising:
    acquiring images of a first plane using a first imaging detector and a second plane using a second imaging detector from received light at a light collection device, the received light having a phase and amplitude at an aperture corresponding to the first plane;
    retrieving the phase over the aperture;
    unwrapping the retrieved phase; and
    analyzing the unwrapped retrieved phase to generate a parameter of a refractive medium through which the received light propagated to the light collection device.

2. The method of claim 1, wherein acquiring images of a first plane and a second plane includes acquiring images of a pupil plane and images of an image plane.

3. The method of claim 1, wherein the method includes generating a structure function from analyzing the unwrapped retrieved phase.

4. The method of claim 1, wherein the method includes providing an unresolved source or a resolved source to generate the received light.

5. The method of claim 1, wherein the method includes providing wavefront phase correction data to an imaging system in real-time.

6. The method of claim 1, wherein analyzing the unwrapped retrieved phase includes determining refractive medium induced wavefront phase errors over the entire aperture.

7. The method of claim 1, wherein the first plane is a pupil plane and the second plane is an image plane, the method including:
    acquiring images of intensity distributions in the image plane and in the pupil plane, the intensity distributions being from wavefronts originating from an illumination source;
    padding edges of the images of the pupil plane and the images of the image plane with zeros;
    applying a phase retrieval algorithm to the padded images to provide a recovered phase map; and
    computing the parameter of the refractive medium based on the recovered phase map.

8. The method of claim 7, wherein applying a phase retrieval algorithm includes applying a Gerchberg-Saxton phase retrieval algorithm.

9. The method of claim 7, wherein the method includes acquiring images of intensity distributions from wavefronts originating from an artificial source.

10. The method of claim 9, wherein acquiring images of intensity distributions from wavefronts originating from an artificial source includes acquiring images of intensity distributions from wavefronts originating from a superluminescent diode.

11. The method of claim 7, wherein the method includes:
    removing zero padding from the recovered phase map;
    removing a tip-tilt component from the recovered phase map; and
    unwrapping phase discontinuities from the recovered phase map.

12. The method of claim 11, wherein the method includes computing a phase structure function and removing time-average phase from the recovered phase map prior to computing the phase structure function.

13. The method of claim 11, wherein the method includes removing complex conjugate degeneracy from the recovered phase map.

14. The method of claim 7, wherein computing the parameter of the refractive medium based on the recovered phase map includes computing a phase structure function for an entire aperture.

15. The method of claim 7, wherein computing the parameter of the refractive medium based on the recovered phase map includes computing a parameter that characterizes turbulence in the atmosphere.

16. A non-transitory machine-readable storage medium comprising instructions stored thereon, which when performed by a machine, cause the machine to:
    acquire images of a first plane using a first imaging detector and a second plane using a second imaging detector from received light at a light collection device, the received light having a phase and amplitude at an aperture corresponding to the first plane;
    retrieve the phase over the aperture;
    unwrap the retrieved phase; and
    analyze the unwrapped retrieved phase to generate a parameter of a refractive medium through which the received light propagated to the light collection device.

17. The non-transitory machine-readable storage medium of claim 16, wherein the instructions, which when performed by a machine, cause the machine to acquire images of a first plane and a second plane from received light include instructions to acquire images of a pupil plane and images of an image plane.

18. The non-transitory machine-readable storage medium of claim 16, wherein the instructions include instructions to control a transmitter to generate the received light.

19. The non-transitory machine-readable storage medium of claim 16, wherein the instructions include instructions to provide wavefront phase correction data to an imaging system in real-time.

20. The non-transitory machine-readable storage medium of claim 16, wherein the instructions include instructions to:
    acquire images of intensity distributions in an image plane and in a pupil plane, the intensity distributions being from wavefronts originating from an illumination source;
    pad edges of images of the pupil plane and images of the image plane with zeros;
    apply a phase retrieval algorithm to provide a recovered phase map; and
    compute a parameter of a refractive medium based on the recovered phase map.

21. The non-transitory machine-readable storage medium of claim 20, wherein the instructions, which when performed by a machine, cause the machine to apply a phase retrieval algorithm include instructions to apply a Gerchberg-Saxton phase retrieval algorithm.

22. The non-transitory machine-readable storage medium of claim 20, wherein the instructions include instructions to:
    remove zero padding from the recovered phase map;
    remove a tip-tilt component from the recovered phase map; and
    unwrap phase discontinuities from the recovered phase map.

23. The non-transitory machine-readable storage medium of claim 20, wherein the instructions include instructions to compute a phase structure function and to remove time-average phase from the recovered phase map prior to computing the phase structure function.

24. The non-transitory machine-readable storage medium of claim 16, wherein the instructions include instructions to generate a parameter that characterizes turbulence in an atmosphere through which the received light propagates.

25. An apparatus comprising:
- a means to measure two images that are Fourier conjugates of each other from light received at a light collection device, the two images correlated to the light at an aperture, the light having a phase;
- a means to retrieve the phase over the aperture;
- a means to unwrap the retrieved phase; and
- a means to analyze the unwrapped phase to provide a parameter of a refractive medium through which the received light propagated to the light collection device, based on the unwrapped phase.

26. The apparatus of claim 25, wherein the apparatus includes a transmitter to generate the light.

27. The apparatus of claim 26, wherein the apparatus includes a means to control both the transmitter and the means to measure two images.

28. The apparatus of claim 27, wherein the means to control both the transmitter and the means to measure two images includes an automatic focus.

29. The apparatus of claim 25, wherein the parameter includes a structure function.

30. The apparatus of claim 25, wherein a means to analyze the unwrapped phase includes machine-readable instructions to generate a plurality of parameters of the refractive medium.

31. An apparatus comprising:
- a first detector to provide a first image from received light at a light collection device;
- a second detector to provide a second image from the received light;
- optics to direct portions of the received light to the first detector and to the second detector such that the first image is substantially a Fourier conjugate of the second image; and
- an analysis unit to provide a recovered phase map based on application of a phase retrieval algorithm to the first and the second images with edges padded with zeros and to compute a parameter of a refractive medium through which the received light propagated to the light collection device based on the recovered phase map.

32. The apparatus of claim 31, wherein the first image is an image at a focal plane and the second image is an image at a pupil plane.

33. The apparatus of claim 31, wherein the apparatus includes an output to send information of a measurement of perturbation of a wavefront of the received light at a pupil corresponding to the second image.

34. The apparatus of claim 31, wherein the parameter includes a structure function that characterizes an atmosphere in which the received light propagates.

35. The apparatus of claim 31, wherein the apparatus includes a transmitter.

36. The apparatus of claim 35, wherein the transmitter includes artificial point source.

37. The apparatus of claim 35, wherein the transmitter includes an unresolved source.

38. The apparatus of claim 35, wherein the transmitter includes a resolved source.

39. The apparatus of claim 35, wherein the transmitter includes a superluminescent diode.

40. The apparatus of claim 31, wherein the apparatus includes a telescope to collect the received light.

41. The apparatus of claim 31, wherein the optics includes a beamsplitter to direct energy from an illumination source simultaneously to planes of the two conjugate images.

42. The apparatus of claim 31, wherein the apparatus includes an automatic unit to maintain focus in planes of the two conjugate images.

43. The apparatus of claim 31, wherein the first and second detector include area-format detectors to record the conjugate images.

44. The apparatus of claim 31, wherein the optics include optical bandpass filters to maintain measurements within a dynamic range of the detectors.

45. The apparatus of claim 31, wherein the second detector includes an area-format detector and the optics include a Fabry lens to generate the second image onto the area-format detector at a specified image scale.

46. The apparatus of claim 31, wherein the apparatus includes a data acquisition system to control acquisition of the first and second images.

47. The apparatus of claim 46, wherein the apparatus includes a transmitter under the control of the data acquisition system.

48. The apparatus of claim 31, wherein the first detector is an image plane detector to provide an image of an image plane from the received light, the second detector is a pupil plane detector to provide an image of a pupil plane from the received light, and the analysis unit includes a data monitor executable by a processor, the data monitor operable to:
- acquire images of intensity distributions in the image plane and in the pupil plane, the intensity distributions being from wavefronts originating from the received light;
- pad edges of the images of the pupil plane and edges of the images of the image plane with zeros;
- apply a phase retrieval algorithm to the padded images to provide a recovered phase map; and
- compute a parameter of a refractive medium based on the recovered phase map.

49. The apparatus of claim 48, wherein the data monitor is operable to provide measurements of refractive medium induced wavefront phase errors over an entire aperture, the aperture correlated to the pupil plane.

50. The apparatus of claim 48, wherein the apparatus includes a data acquisition system to make real-time measurements of turbulence.

51. The apparatus of claim 48, wherein the data monitor is operable to determine turbulence in real-time.

52. The apparatus of claim 48, wherein the data monitor is operable to provide in real time parameters that characterize turbulence.

53. The apparatus of claim 48, wherein the data monitor is operable to send wavefront phase correction data to an imaging system.

54. The apparatus of claim 48, wherein the apparatus includes the imaging system.

* * * * *